United States Patent
Choi et al.

(10) Patent No.: US 11,961,512 B2
(45) Date of Patent: Apr. 16, 2024

(54) SYSTEM AND METHOD FOR PROVIDING VOICE ASSISTANCE SERVICE

(71) Applicant: Samsung Electronics Co., Ltd., Suwon-si (KR)

(72) Inventors: Wonjong Choi, Suwon-si (KR); Soofeel Kim, Suwon-si (KR); Yewon Park, Suwon-si (KR); Jina Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 17/385,370

(22) Filed: Jul. 26, 2021

(65) Prior Publication Data
US 2021/0350797 A1    Nov. 11, 2021

Related U.S. Application Data

(63) Continuation of application No. PCT/KR2020/001180, filed on Jan. 23, 2020.

(30) Foreign Application Priority Data

Jan. 25, 2019   (KR) .................. 10-2019-0010059

(51) Int. Cl.
*G06F 16/33*    (2019.01)
*G10L 15/06*    (2013.01)
(Continued)

(52) U.S. Cl.
CPC ............ *G10L 15/16* (2013.01); *G10L 15/063* (2013.01); *G10L 15/083* (2013.01); *G10L 15/22* (2013.01);
(Continued)

(58) Field of Classification Search
CPC ................................... G06F 16/3338
See application file for complete search history.

(56) References Cited

U.S. PATENT DOCUMENTS 7,231,343 B1 *  6/2007  Treadgold ............... G06F 40/30
                                                   707/999.005
7,392,278 B2    6/2008  Chen et al.
(Continued)

FOREIGN PATENT DOCUMENTS

JP       2012-524343 A    10/2012
KR    10-2005-0076811 A    7/2005
(Continued)

OTHER PUBLICATIONS

Zhu, et al., "Clustering and Load Balancing Optimization for Redundant Content Removal," WWW 2012 Companion. (Year: 2012).*

(Continued)

*Primary Examiner* — Feng-Tzer Tzeng
(74) *Attorney, Agent, or Firm* — Jefferson IP Law, LLP

(57) ABSTRACT

An artificial intelligence (AI) system using a machine learning algorithm such as deep learning, and an application thereof are provided. A method of providing, by a device, a voice assistance service includes obtaining a voice input of a user, receiving certain context information from at least one peripheral device, generating first query information from the received context information and the voice input, generating second query information including noise information by inputting the first query information into a noise learning model, transmitting the generated second query information to a server, receiving, from the server, response information obtained based on the transmitted second query information, generating a response message by removing response information corresponding to the noise information
(Continued)

from the received response information, and outputting the response message.

13 Claims, 23 Drawing Sheets

(51) Int. Cl.
*G10L 15/08* (2006.01)
*G10L 15/16* (2006.01)
*G10L 15/22* (2006.01)
*G10L 21/0208* (2013.01)

(52) U.S. Cl.
CPC ...... *G10L 21/0208* (2013.01); *G06F 16/3338* (2019.01); *G10L 2015/223* (2013.01)

(56) References Cited

U.S. PATENT DOCUMENTS

| | | |
|---|---|---|
| 9,195,898 B2 | 11/2015 | Huang et al. |
| 9,390,716 B2 | 7/2016 | Nakano et al. |
| 10,579,652 B2 | 3/2020 | Bennett et al. |
| 2012/0233140 A1 | 9/2012 | Collins-Thompson et al. |
| 2013/0290001 A1 | 10/2013 | Yun et al. |
| 2017/0358317 A1 | 12/2017 | James |
| 2018/0277105 A1 | 9/2018 | Zhang |
| 2018/0322870 A1 | 11/2018 | Lee et al. |

FOREIGN PATENT DOCUMENTS

| | | |
|---|---|---|
| KR | 10-2010-0081871 A | 7/2010 |
| KR | 10-2017-0021246 A | 2/2017 |

OTHER PUBLICATIONS

Nazanin Takbiri et al., "Matching Anonymized and Obfuscated Time Series to Users' Profiles," XP081315834, Jun. 28, 2018.
Hidetoshi Kido et al., "Protection of Location Privacy using Dummies for Location-based Services," Apr. 5, 2005, XP010924155.
Extended European Search Report dated Sep. 15, 2022, issued in European Patent Application No. 20744855.6.
International Search Report dated May 6, 2020, issued in International Patent Application No. PCT/KR2020/001180.
European Office Action dated Oct. 20, 2023, issued in European Patent Application No. 20744855.6.

* cited by examiner

FIG. 8

Soju,
Bear

Is there a good snack recipe?

<First query information>

Soju,
Goryangju (noise)
Bear
Wine (noise)

Is there a good snack recipe?

<Second query information>

First query information vs. Second query information ⟶ Noise

SYSTEM AND METHOD FOR PROVIDING VOICE ASSISTANCE SERVICE

CROSS-REFERENCE TO RELATED APPLICATION(S)

This application is a continuation application, claiming priority under § 365(c), of an International application No. PCT/KR2020/001180, filed on Jan. 23, 2020, which is based on and claims the benefit of a Korean patent application number 10-2019-0010059, filed on Jan. 25, 2019, in the Korean Intellectual Property Office, the disclosure of which is incorporated by reference herein in its entirety.

BACKGROUND

1. Field

The disclosure relates to a system and method for providing a voice assistance service.

2. Description of Related Art

Unlike an existing rule-based smart system, an artificial intelligence (AI) system allows a machine to learn, determine, and become more intelligent by itself. Because an AI system may have a higher recognition rate and more accurately understand user tastes as it is used more, existing rule-based smart systems have been gradually replaced with deep learning-based AI systems.

AI technology includes machine learning (deep learning) and elementary technologies utilizing machine learning.

Machine learning is an algorithm technology for classifying/learning the characteristics of input data by itself, and the elementary technologies are technologies using a machine learning algorithm such as deep learning and may include technical fields such as linguistic understanding, visual understanding, reasoning/prediction, knowledge representation, and motion control.

Various fields in which AI technology is applied are as follows. Linguistic understanding is a technology for recognizing and applying/processing human languages/characters and may include natural language processing, machine translation, conversation systems, question and answer, and voice recognition/synthesis. Visual understanding is a technology for recognizing and processing objects, as done by human vision, and may include object recognition, object tracking, image search, human recognition, scene understanding, space understanding, and image improvement. Reasoning/prediction is a technology for reasoning and predicting logically by determining information and may include knowledge/probability-based reasoning, optimization prediction, preference-based planning, and recommendation. Knowledge representation is a technology for automatically processing human experience information into knowledge data and may include knowledge construction (data generation/classification), and knowledge management (data utilization). Motion control is a technology for controlling autonomous driving of a vehicle and motion of a robot and may include motion control (navigation, collision, and driving) and operation control (behavior control).

Moreover, there is demand for a technology for effectively providing a voice assistance service while using AI technology. Particularly, in the case of providing a voice assistance service, a technology for effectively protecting personal privacy is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method capable of increasing the convenience and satisfaction of a user using a voice assistance service.

Another aspect of the disclosure is to provide a system and method for providing a voice assistance service based on query information including noise information by using a learning model.

Another aspect of the disclosure is to control an operation of a peripheral device based on a response message generated by using a voice assistance service.

Additional aspects will be set forth in part in the description which follows and, in part, will be apparent from the description, or may be learned by practice of the presented embodiments.

In accordance with an aspect of the disclosure, a method of providing, by a device, a voice assistance service is provided. The method includes obtaining a voice input of a user, receiving certain context information from at least one peripheral device, generating first query information from the received context information and the voice input, generating second query information including noise information by inputting the first query information into a noise learning model, transmitting the generated second query information to a server, receiving, from the AI service providing server, response information generated based on the transmitted second query information, generating a response message by removing response information corresponding to the noise from the received response information, and outputting the response message.

In accordance with another aspect of the disclosure, a device is provided. The device includes a communication interface, a memory storing one or more interfaces, and a processor controlling the device by executing the one or more interfaces, wherein the processor is configured to obtain a voice input of a user, receive certain context information from at least one peripheral device, generate first query information from the received context information and the voice input, generate second query information including noise information by inputting the first query information into a noise learning model, transmit the generated second query information to an AI service providing server, receive, from the server, response information generated based on the transmitted second query information, generate a response message by removing information corresponding to the noise from the received response information, and output the response message.

In accordance with another aspect of the disclosure, a computer program device is provided. The computer program device includes a computer-readable recording medium having recorded thereon a program for executing the method of the first aspect on a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7 and 8 are diagrams illustrating examples of first query information and second query information, according to various embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

Also, herein, a voice assistance service may be a service for providing a conversation with a user. In the voice assistance service, by considering the situation of a user and the situation of a device, a response message may be provided to the user as if the device directly converses with the user. Also, in the voice assistance service, like a personal assistant of the user, information required by the user may be suitably generated and provided to the user, and peripheral devices of the user may be effectively controlled.

A learning model may include an artificial intelligence algorithm that is a learning model having been trained by using at least one of machine learning, an artificial neural network, a genetic algorithm, deep learning, and a classification algorithm.

Hereinafter, the disclosure will be described in detail with reference to the accompanying drawings.

Figure 1:
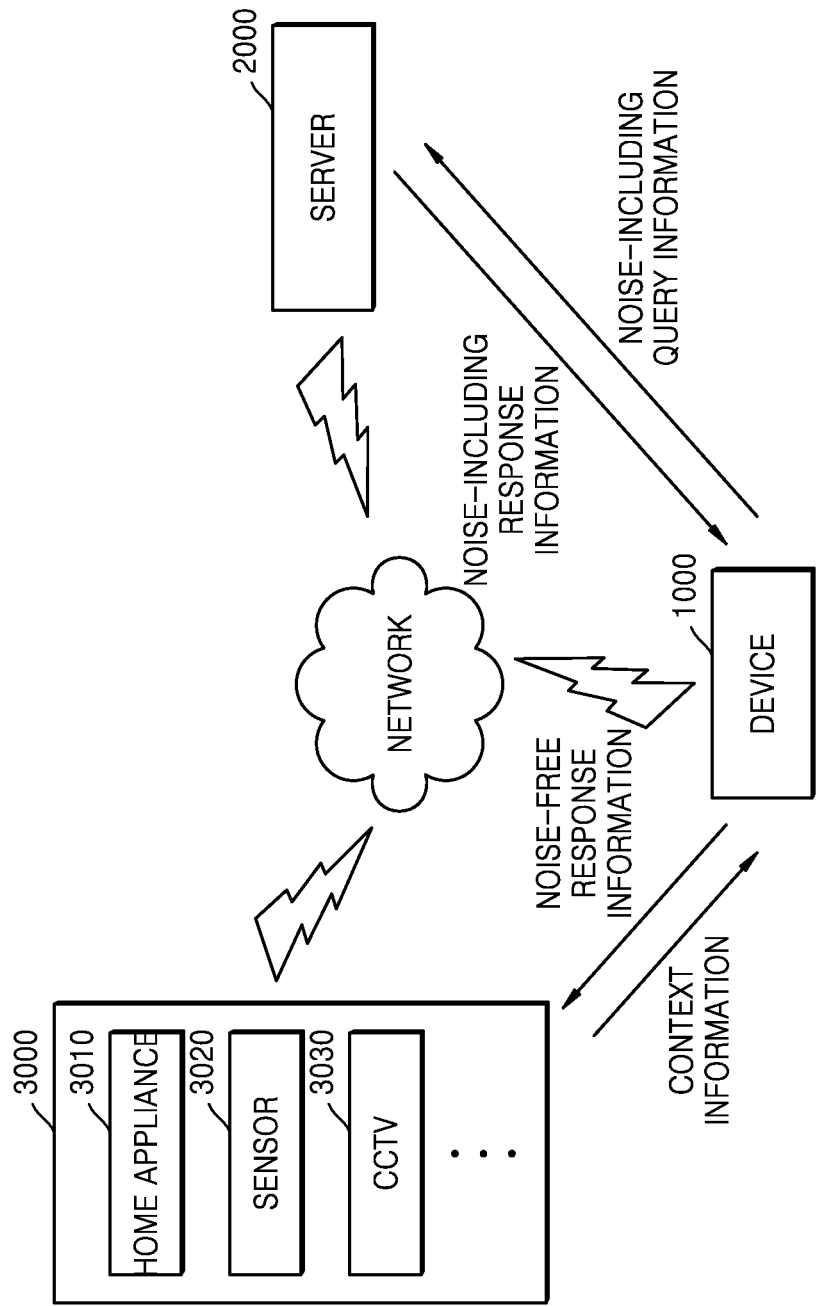
FIG. 1 is a schematic diagram of a system for providing a voice assistance service, according to an embodiment of the disclosure.

FIG. 1 is a schematic diagram of a system for providing a voice assistance service, according to an embodiment of the disclosure.

Referring to FIG. 1, a system for providing a voice assistance service may include a device 1000, a server 2000, and a peripheral device 3000.

The device 100 may provide a voice assistance service to a user by using context information obtained from the peripheral device 300. Particularly, a response message suitable for the user's intention may be output or the peripheral device 300 may be controlled by reflecting the user's intention.

The response message may include, for example, a natural language for conversing with the user and data about a control command for controlling the peripheral device.

Also, the device 100 may generate query information based on context information in order to request the server 200 for a response message corresponding to the user's intention. The device 100 may generate first query information by considering the context information and the user's intention and may generate second query information by adding noise information to the first query information.

The device 1000 may output a response message with respect to a user's voice input in order to provide a voice assistance service. A learning model of the voice assistance service may be a basic learning model used by a voice assistant program that is installed in the device 1000 by default. Particularly, the device 1000 may use a voice interpretation model for interpreting a user's voice input. Also, the device 1000 may obtain context information related to a user's voice input from the peripheral device 3000 and may use a learning model to obtain query information from the context information. Also, the device 1000 may use a learning model to include noise information in query information including user's privacy information.

The device 1000 may include, but is not limited to, a smartphone, a tablet personal computer (PC), a PC, a smart television (TV), a mobile phone, a personal digital assistant (PDA), a laptop computer, a media player, a server, a micro server, a global positioning system (GPS) device, an e-book terminal, a digital broadcasting terminal, a navigation device, a kiosk, a Moving Picture Experts Group phase 1 or phase 2 (MPEG-1 or MPEG-2) audio layer 3 (MP3) player, a digital camera, a speaker, or other mobile or non-mobile computing devices, which is mounted with an AI program and includes a voice recognition function. That is, the device 1000 may include all types of devices that may be connected to the server 2000 and the peripheral device 3000 through a network and may exchange data with each other.

The server 2000 may be a server that generates and manages a response message to be provided to the device 1000, based on the received query information. Particularly, when query information including noise information is received from the device 1000, the server 2000 may generate a response message by using a learning model. That is, the server 2000 may generate response information including noise information. Also, the server 2000 may transmit the generated response information to the device 1000.

The peripheral device 3000 may be a device within a certain range from the device 1000. For example, when the device 1000 is in a house, the peripheral device 3000 may include a device located in the house. The peripheral device 3000 may transmit the obtained context information to the device 1000 periodically or at the request of the device 1000.

The peripheral device 3000 may include a device capable of obtaining context information of the user, such as a home appliance 3010, a sensor 3020, or a closed-circuit television (CCTV) 3030, but is not limited to thereto. The peripheral device 3000 may include all types of devices that may be connected to the device 1000 through a network and may exchange data with each other.

The network may include a local area network (LAN), a wide area network (WAN), a value added network (VAN), a mobile radio communication network, a satellite communication network, or any combination thereof, may be a data communication network in a generic sense that allows the network members illustrated in FIG. 1 to smoothly communicate with each other, and may include a wired Internet, a wireless Internet, and a mobile wireless communication network.

Figure 2:
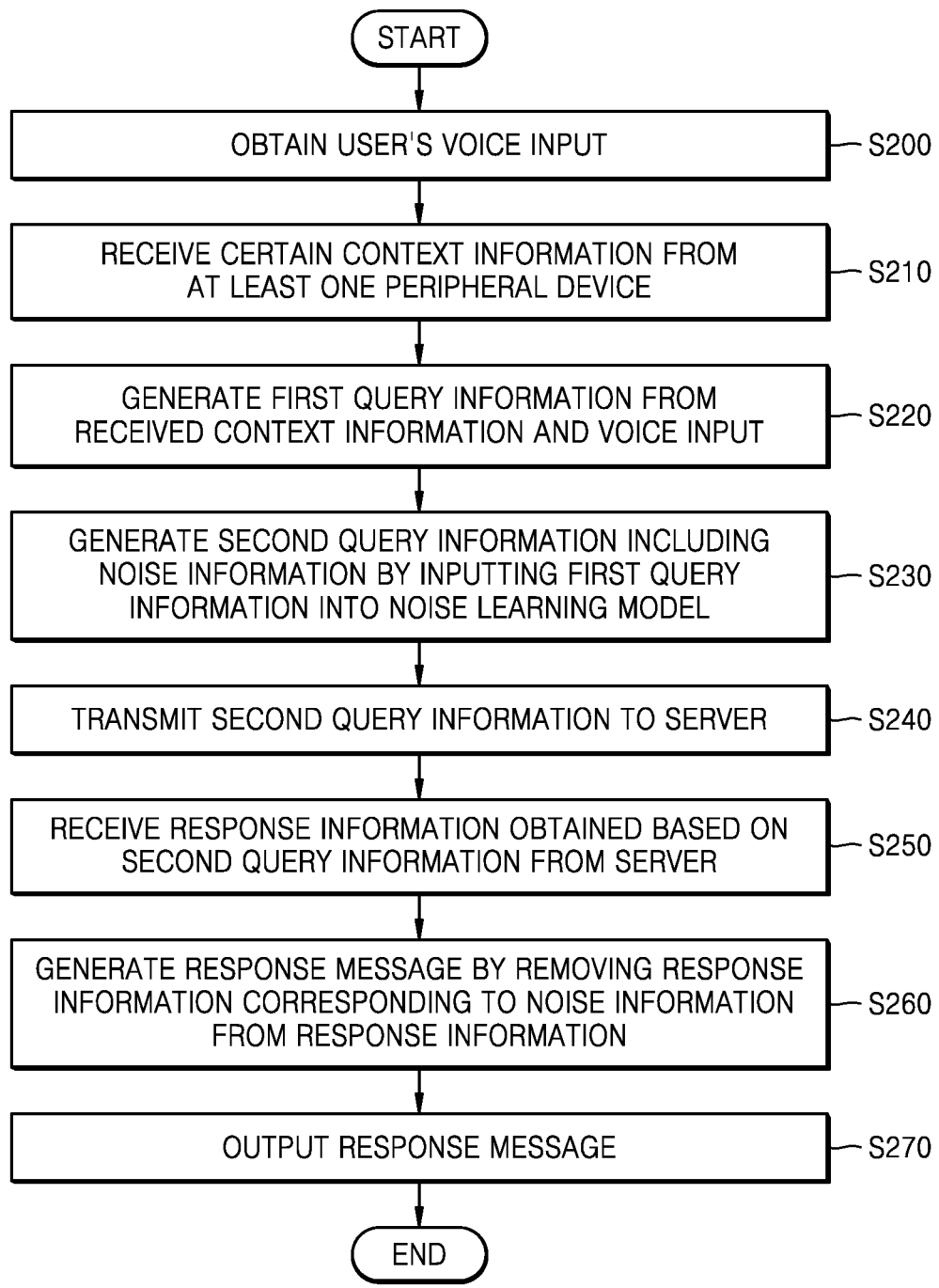
FIG. 2 is a flowchart of a method of providing, by a device, a voice assistance service, according to an embodiment of the disclosure.

FIG. 2 is a flowchart of a method of providing, by a device, a voice assistance service, according to an embodiment of the disclosure.

Referring to FIG. 2, in operation S200, a device 1000 may obtain a user's voice input. The device 1000 may obtain a voice input in order to provide a voice assistance service. The device 1000 may directly obtain a user's voice input through an audio device and may also obtain a user's voice input received in the peripheral device 3000.

In operation S210, the device 1000 may receive certain context information from at least one peripheral device 3000. Particularly, the device 1000 may receive context information including user's privacy information from the peripheral device 3000. For example, the device 1000 may obtain user's weight information from a weight scale and may obtain user's position information by using a GPS sensor included in a smart watch.

The context information may include at least one of an image, a measurement value, and sensing data that are obtained from the peripheral device 3000. The context information may include, but is not limited to, at least one of environment information related to the position of the peripheral device 3000, user's state information measured by the peripheral device 3000, user's use history information of the peripheral device 3000, and user's schedule information. The environment information of the peripheral device 3000 may refer to environmental information within a certain radius from the peripheral device 3000 and may include, for example, weather information, temperature information, humidity information, illuminance information, noise information, and/or sound information but is not limited thereto. Also, the context information may include application information (e.g., application identification information, application type, application use time, and/or application use period) executed in the peripheral device 3000 but is not limited thereto. The user's state information may be information about the user's body, movement, and life pattern and may include information about the user's weight, blood pressure, heart rate, walking state, exercise state, driving state, sleep state, and/or mood state but is not limited thereto. The user's use history information of the peripheral device 3000 may be information about the user's use history of the peripheral device 3000 and may include the execution history of applications, the history of functions executed in applications, the user's call history, and the user's text history but is not limited thereto.

In operation S220, the device 1000 may generate first query information from the received context information and the voice input. The first query information may be generated based on the user's intention included in the voice input and the user's state information included in the context information. The user's state information may be information representing the user's state. The device 1000 may use a voice interpretation model to catch the user's intention from the voice input. The first query information may be generated by reflecting information related to the user's privacy included in the context information. For example, the device 1000 may generate the first query information by extracting the user's state information related to the user's voice input from the context information. The first query information may include keywords required to generate a response message according to the user's intention.

In operation S230, the device 1000 may generate second query information including noise information by inputting the first query information into a noise learning model. The device 1000 may generate and store noise information related to the first query information. When the device 1000 transmits the first query information related to the user's context information to the server 2000 as it is, because information related to the user's privacy may be transmitted as it is, the second query information may be generated by including the noise information in the first query information. The noise information may be generated with respect to the information related to the user's privacy among the information included in the first query information, and the generated noise information may be included in the second query information. Also, the device 1000 may generate second query information by changing a numerical data value related to the user's body information included in the context information to another numerical data value according to a certain reference.

In operation S240, the device 1000 may transmit the second query information to the server 2000. Because the second query information may further include the noise information as well as the user's context information, the server 2000 may not identify the user's privacy information included in the second query information.

In operation S250, the device 1000 may receive response information generated based on the second query information from the server 2000. The response information may be generated based on the second query information and may include response information corresponding to the noise information. The response information generated based on the second query information may include, for example, response information generated based on the privacy information and response information generated based on the noise information. The response information may be generated from the server 2000 by using a learning model.

In operation S260, the device 1000 may generate a response message by removing the response information corresponding to the noise information from the response information. The device 1000 may remove the response information corresponding to the noise information from the response information based on the noise information used to generate the second query information. The device 100 may remove the response information generated based on the noise information from the response information generated based on the second query information. Also, the device 100 may modify the response information generated based on the noise information from the response information generated based on the second query information.

In operation S270, the device 1000 may output the response message. The device 1000 may output a sound of the response message through a speaker of the device 1000. Also, the device 1000 may display a text of the response message on a screen of the device 1000 but is not limited thereto. Also, the device 100 may control an operation of the peripheral device 300 based on the response message.

Figure 3:
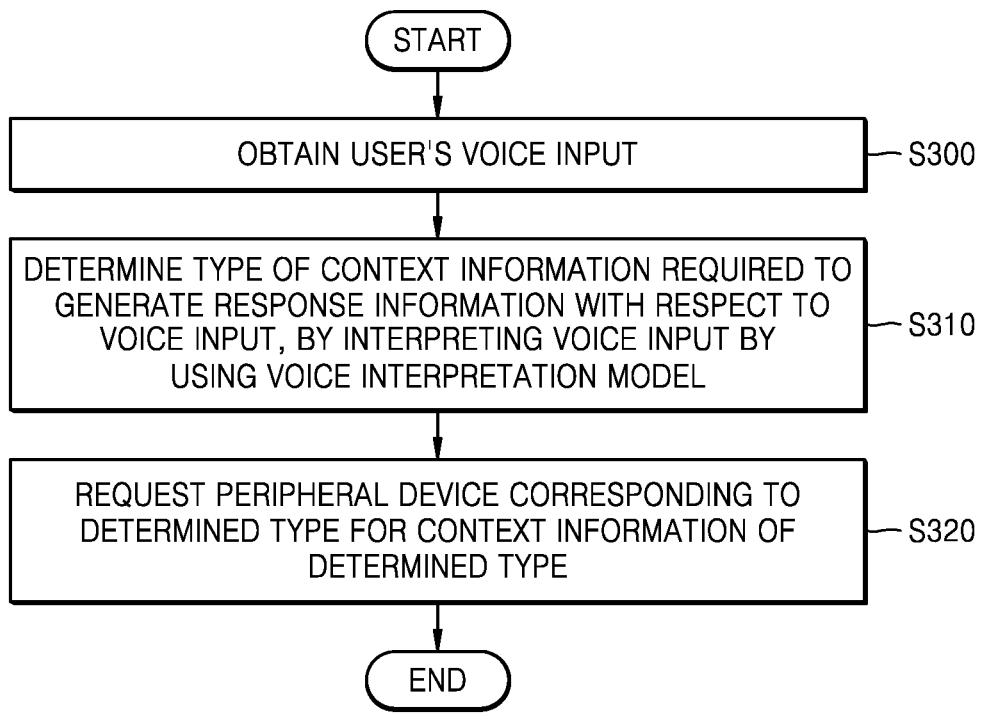
FIG. 3 is a flowchart of a method of requesting, by a device, context information, according to an embodiment of the disclosure.

FIG. 3 is a flowchart of a method of requesting, by a device, context information, according to an embodiment of the disclosure.

Referring to FIG. 3, in operation S300, a device 1000 may obtain a user's voice input. Because an operation of obtaining the user's voice input is the same as that described above in FIG. 2, redundant descriptions thereof will be omitted for conciseness.

In operation S310, the device 1000 may determine a type of context information required to generate response information with respect to the voice input, by interpreting the voice input by using a voice interpretation model. Particularly, before receiving the context information, the device 1000 may determine the type of required context information. In this case, the device 1000 may determine at least one of an image, a measurement value, and sensing data, which are obtained from the peripheral device 3000, as the type of context information required to generate response information. That is, the type of required context information may vary according to the meaning included in the user's voice input.

For example, when the voice input is "recommend a TV program", the device 1000 may determine a user's 'TV program viewing history', that is, 'user metadata' prestored in a TV, as the type of required context information in order to provide a list of recommended TV programs with high user preference. That is, the device 1000 may determine sensing data in the TV as the type of required context information. Moreover, when the voice input is "What should I eat for dinner?", the device 1000 may require information about food ingredients owned by the user in order to recommend a 'dinner menu'. In this case, the device 1000 may determine an image of the inside of a refrigerator as the type of required context information.

In operation S320, the device 1000 may request the peripheral device 3000 corresponding to the determined type for context information of the determined type. For example, when the 'user metadata' including the user's viewing history is determined as the type of context information, the device 1000 may request the TV, which is one of the peripheral devices 3000, for the 'user metadata'. Also, when an image including food ingredient information owned by the user is determined as the type of context information, the device 1000 may request the refrigerator, which is one of the peripheral devices 3000, for 'an image of the inside of the refrigerator'. The type of context information is not limited thereto, and the device 1000 may first determine the type of required context information and then request the peripheral device 3000 corresponding to the type of context information for context information of the determined type.

Figure 4:
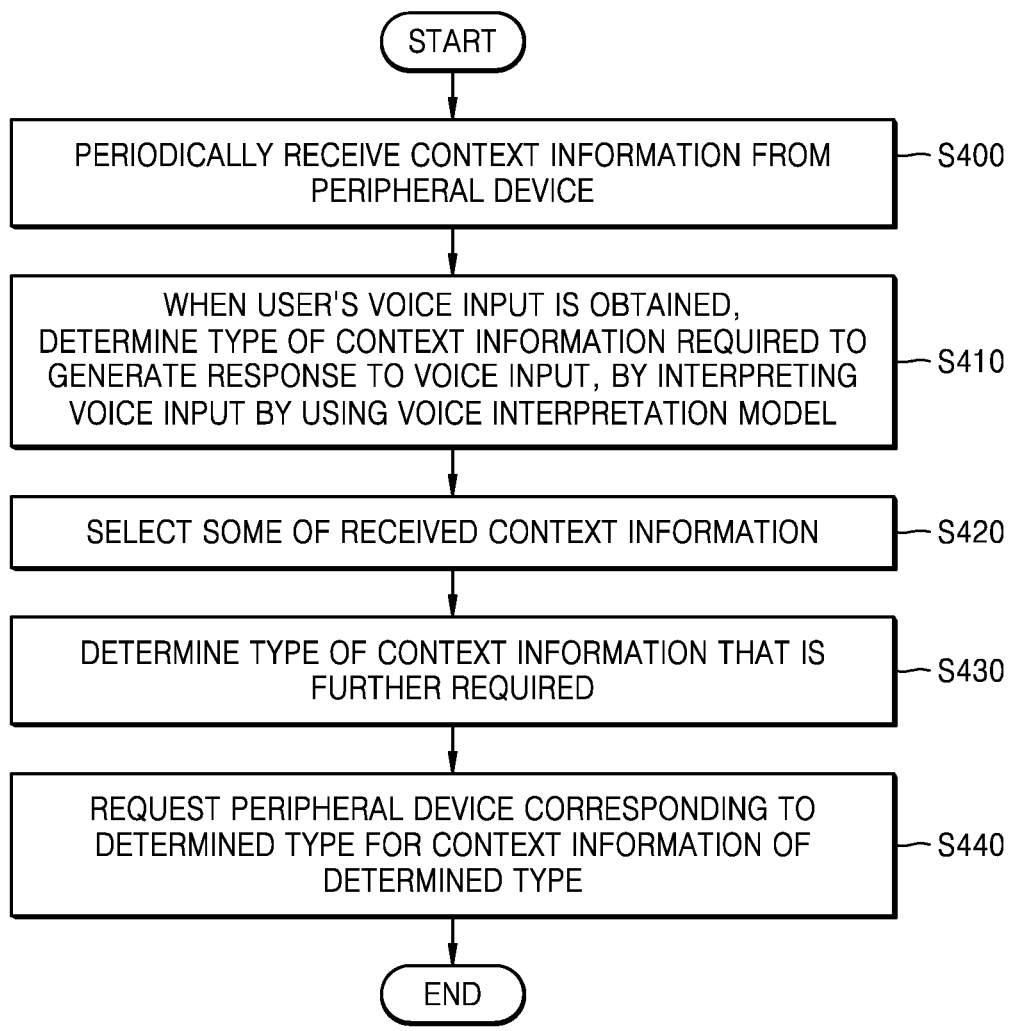
FIG. 4 is a flowchart of a method of obtaining, by a device, context information, according to an embodiment of the disclosure.

FIG. 4 is a flowchart of a method of obtaining, by a device, context information, according to an embodiment of the disclosure.

Referring to FIG. 4, in operation S400, a device 1000 may periodically receive context information from a peripheral device 3000. Also, when the context information is periodically received from the peripheral device 3000, the device 1000 may update the prestored context information based on the newly-received context information. Even before the user's voice input is obtained, the device 1000 may receive the context information from the peripheral device 3000 at certain periods. That is, regardless of whether the user's voice input has been obtained or the type of required context information, the device 1000 may periodically receive context information from the peripheral device 3000 and store the received context information.

In operation S410, when the user's voice input is obtained, the device 1000 may determine a type of context information required to generate a response to the voice input, by interpreting the voice input by using a voice interpretation model.

In operation S420, the device 1000 may select some of the received context information. Particularly, the device 1000 may select context information required to generate a response message among the context information periodically received from the peripheral device 3000. Moreover, the device 1000 may not select context information when there is no required context information among the received context information.

In operation S430, the device 1000 may determine a type of context information that is further required. When at least some of the context information required to generate a response to the user's voice input is not included in the received context information, the device 1000 may determine the type of context information further required to additionally receive context information. That is, the device 1000 may determine the type of other context information other than the context information selected in operation S420 among the required context information.

In operation S440, the device 1000 may request the peripheral device corresponding to the determined type for context information of the determined type. Because operation S440 may correspond to operation S320 described above, redundant descriptions thereof will be omitted for conciseness.

Figure 5:
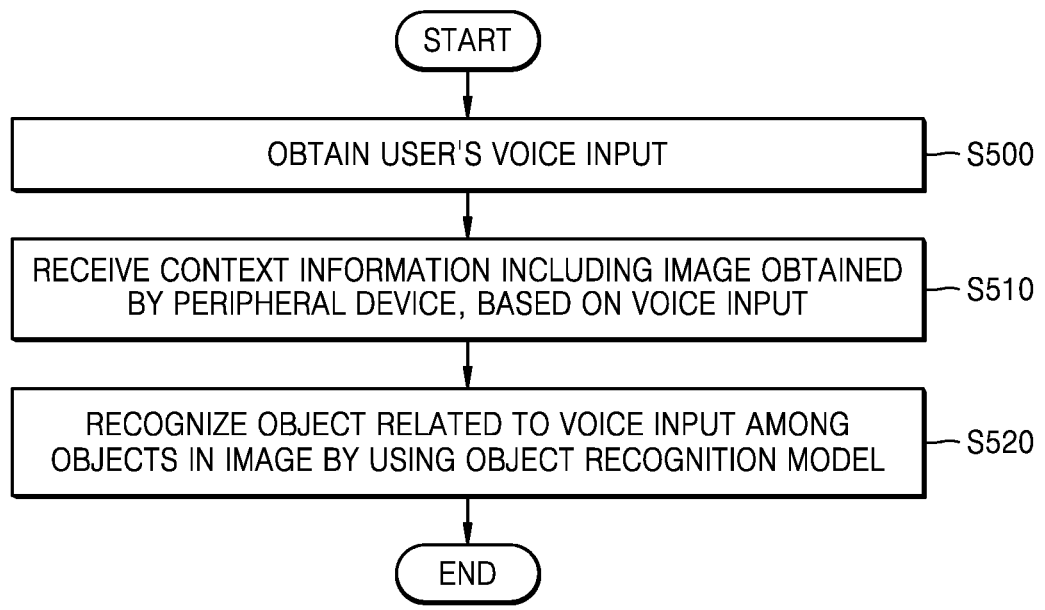
FIG. 5 is a flowchart of a method of recognizing, by a device, an object of an image included in context information, according to an embodiment of the disclosure.

FIG. 5 is a flowchart of a method of recognizing, by a device, an object of an image included in context information, according to an embodiment of the disclosure.

Referring to FIG. 5, in operation S500, a device 1000 may obtain a user's voice input. Because an operation of obtaining the user's voice input is the same as that described above in FIGS. 2 to 4, redundant descriptions thereof will be omitted for conciseness.

In operation S510, the device 1000 may receive context information including an image obtained by the peripheral device 3000, based on the user's voice input. For example, when the peripheral device 3000 is the CCTV 3030, the device 1000 may receive context information including an image obtained by the CCTV 3030. Also, when the peripheral device 3000 is the home appliance 3010, the device 1000 may receive context information including an image sensed or obtained by the home appliance 3010.

In operation S520, the device 1000 may recognize an object related to the voice input among the objects in the image by using an object recognition model. Particularly, when the context information includes an image, the device 1000 may use a learning model to recognize an object included in the image. The device 1000 may recognize only an object related to the user's voice input among the objects included in the image. Also, after recognizing all the objects included in the image, the device 1000 may extract only an object related to the user's voice input.

Figure 6:
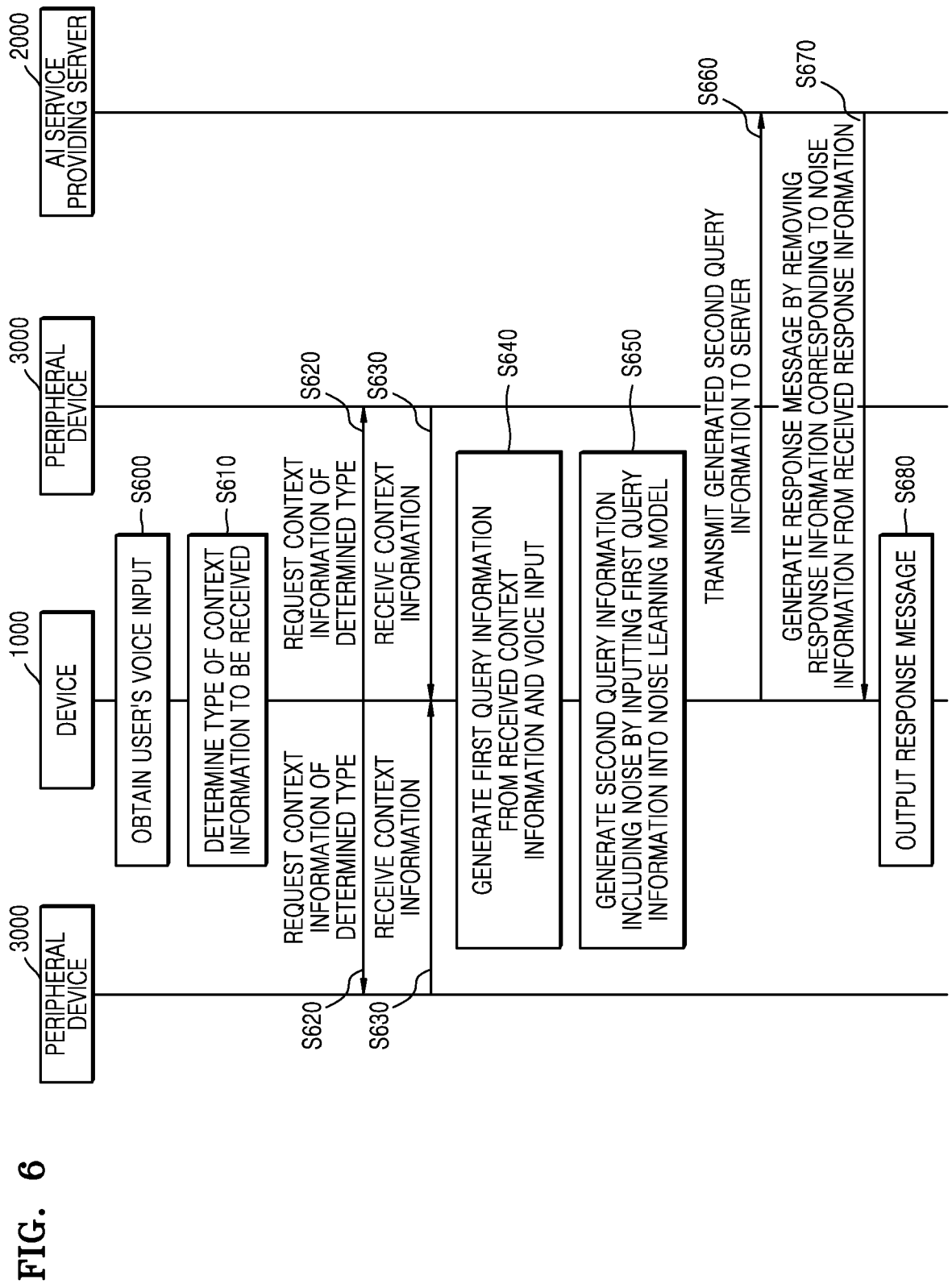
FIG. 6 is a flowchart of a method of providing, by a device, an AI service providing server, and another device, a voice assistance service, according to an embodiment of the disclosure.

FIG. 6 is a flowchart of a method of providing, by a device, a server, and another device, a voice assistance service, according to an embodiment of the disclosure.

Referring to FIG. 6, in operation S600, a device 1000 may obtain a user's voice input. Particularly, the device 1000 may execute a voice assistant. The voice assistant may be an assistant program installed in the device by the manufacturer of the device 1000 but is not limited thereto. The user may input a voice into the device 1000 in order to receive a voice assistance service. In this case, the device 1000 may directly obtain a user's voice input by using an audio device such as a microphone. Moreover, the device 1000 may obtain, from the peripheral device 3000, a user's voice input received in the peripheral device 3000.

In operation S610, the device 1000 may determine the type of context information to be received. The type of context information required to generate a response message to be provided to the user may vary according to the meaning included in the user's voice input. Thus, the device 1000 may determine the type of required context information before requesting the peripheral device 3000 for the context information. In this case, the device 1000 may use a voice interpretation model to interpret the meaning included in the user's voice input.

In operation S620, when the type of required context information is determined, the device 1000 may request the peripheral device 3000 for context information of the determined type. The type of context information may include an image, a measurement value, sensing data, and the like, and the device 1000 may request the peripheral device 3000 for context information of the determined type according to the type of context information determined in operation S610.

In operation S630, the device 1000 may receive context information from the peripheral device 3000. The device 1000 may receive context information from the peripheral device 3000 as it requests the peripheral device 3000 for context information of the determined type. Moreover, the device 1000 may periodically receive context information from the peripheral device 3000. That is, regardless of the type of required context information, the device 1000 may periodically receive context information from the peripheral device 3000 and store the received context information. When the context information is received from the peripheral device 3000, the device 1000 may update the prestored context information.

In operation S640, the device 1000 may generate first query information from the received context information and the voice input. In this case, the device 1000 may generate the first query information by using a plurality of learning models. For example, the device 1000 may use a voice interpretation model to interpret the user's voice input. Also, the device 1000 may generate the first query information including keyword information included in the context information based on the interpretation of the user's voice input. For example, when the context information includes an image obtained by the peripheral device 3000, the device 1000 may recognize an object related to the interpreted voice input among the objects in the obtained image by using an object recognition model.

In operation S650, the device 1000 may generate second query information including noise information by inputting the first query information into a noise learning model. Particularly, the noise learning model may generate the noise information including similar word information corresponding to the keyword included in the first query information by using at least one of a knowledge base, an open source, or a similar word list. In this case, the device 1000 may store the generated noise information in a memory (not illustrated) of the device 1000.

Moreover, when the context information includes numerical data representing the user's body state, the device 1000 may use a noise learning model to change a value of the numerical data representing the user's body state according to a preset reference in order to generate the second query information including the noise information. The device 1000 may update the noise learning model and manage the updated noise learning model according to the type of context information or the user's privacy information included in the context information.

In operation S660, the device 1000 may transmit the generated second query information to the server 2000. The device 1000 may transmit, to the server 2000, the second query information including the noise information instead of the first query information or the context information including the user's privacy information. Thus, the server 2000 may not identify the user's privacy information from the received second query information, and thus the user's privacy information may be protected.

In operation S670, the device 1000 may generate a response message by removing information corresponding to the noise information from the response information received from the server 2000. The device 1000 may remove response information corresponding to the noise information from the response information, based on the prestored noise information. That is, the device 1000 may generate a response message corresponding to the user's voice input from the response information including the noise information.

In this case, the response message may be obtained by removing response information corresponding to the noise information from the response information by inputting the first query information into a response learning model. By inputting the first query information into the response learning model, the device 1000 may determine information not corresponding to the first query information among the information included in the response information as response information corresponding to the noise information. For example, the device 1000 may determine the second query information corresponding to the response information. Accordingly, based on the difference between the first query information and the second query information, the device 1000 may determine the noise information included in the response information and may remove the information corresponding to the noise from the response information.

In operation S680, the device 1000 may output the response message. The device 1000 may output a sound of the response message through an audio device such as a speaker of the device 1000. Also, the device 1000 may display a text of the response message on a screen of the device 1000 but is not limited thereto. Also, the device 1000 may control an operation of the device 1000 according to the response message.

Figure 7:
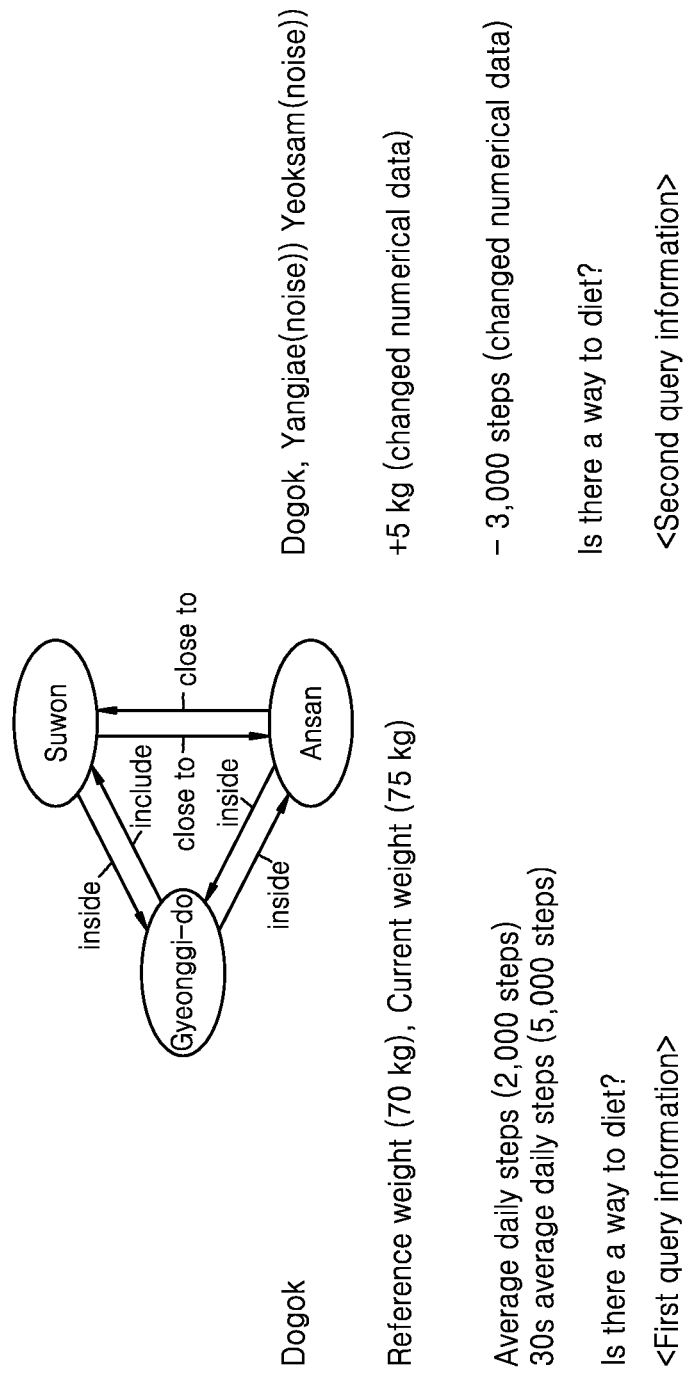

FIGS. 7 and 8 are diagrams illustrating examples of first query information and second query information, according to various embodiments of the disclosure.

Referring to FIG. 7, the first query information may include the user's position information, body information, and query information. For example, the first query information may include 'Dogok' that is the user's position information, the weight and the exercise amount that is the user's body information, and 'Is there a diet method?' that is the query information.

In this case, the device 1000 may generate an area name corresponding to "Dogok" as a noise by using a knowledge base. The knowledge base may be a database in which necessary knowledge is organized and accumulated in a certain format. Particularly, the knowledge base may refer to a database in which expert knowledge accumulated through intellectual activity and experience of the expert or facts and rules necessary for problem solution are stored by category.

The knowledge base may store information for each area based on the inclusion relationship and distance relationship of each area. For example, Gyeonggi-do may include Suwon and Ansan, and Suwon and Ansan may be classified as adjacent areas and stored in the knowledge base.

As such, the device 1000 may generate 'Yangjae' and 'Yeoksam', which are areas within a certain distance from 'Dogok', as a noise based on the knowledge base and may generate second query information in which noise information is added to the first query information. That is, when only 'Dogok' is included in the first query information, the second query information may include 'Dogok', 'Yangjae', and 'Yeoksam'.

Moreover, referring to FIG. 7, the first query information may include numerical data representing the user's body state. In this case, the device 1000 may generate the second query information by changing a value of the numerical data representing the user's body state according to a preset reference. For example, the device 1000 may change the user's current weight '75 kilogram (kg)' to '+5 kg' corresponding to the difference from a reference weight '70 kg'. That is, by using a noise learning model, the device 1000 may generate the second query information corresponding to '+5 kg' from the user's current weight '75 kg' included in the first query information. Likewise, the device 1000 may change the user's average daily steps '2,000 steps' to '−3,000 steps' corresponding to the difference from the 30 s average daily steps '5,000 steps' corresponding to a preset reference. That is, by using a noise learning model, the device 1000 may generate the second query information corresponding to '−3,000 steps' from the user's average daily steps '2,000 steps' included in the first query information. Accordingly, because the second query information does not include the user's body state corresponding to the user's privacy information, even when the second query information is transmitted to the server 2000, the user's privacy information may be protected.

Referring to FIG. 8, the first query information may include Soju, Beer, and 'Is there a good snack recipe?'. The device 1000 may generate the second query information including the noise information by inputting the first query information into the noise learning model by using a list of similar words.

In this case, the device 1000 may generate a word representing a type of alcohol, such as "Soju" or "Beer", as a noise by using a list of similar words. Particularly, the device 1000 may use a wordnet as a list of similar words. The wordnet may be a vocabulary database including semantic relationships between certain words, for example, hypernyms, hyponyms, synonyms, and antonyms. The list of similar words used in the noise learning model is not limited to the wordnet and may include a database for determining the relationship between words based on the semantic distance between words.

By inputting the first query information into the noise learning model, the device 1000 may generate, as a noise, 'Goryangju' or 'Wine' corresponding to a type of alcohol as a similar word corresponding to 'Soju' or 'Beer'. Also, the device 1000 may generate the second query information by adding the generated noise information to the first query information. Accordingly, because the second query information includes 'Soju, Goryangju, Beer, Wine, and Is there a good snack recipe?', the first query information including the user's privacy information may not be identified from the second query information.

FIGS. 9 to 12 are diagrams illustrating examples in which a device generates second query information by using a learning model, according to various embodiments of the disclosure.

Figure 9:
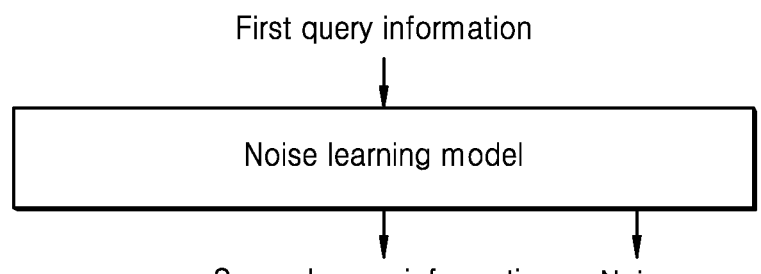
FIGS. 9, 10, 11, and 12 are diagrams illustrating examples in which a device generates second query information by using a learning model, according to various embodiments of the disclosure.

Referring to FIG. 9, a device 1000 according to some embodiments may generate the second query information and the noise information by inputting the first query information into the noise learning model. The device 1000 may generate the second query information including the noise information by inputting the first query information into the noise learning model by using at least one of a knowledge base, an open source, and a list of similar words. In this case, the list of similar words used in the noise learning model may support various classification systems for classifying words. Particularly, the list of similar words may include 15 major categories (person name, area name, institution name, study, event, and the like) and a total of 146 detailed categories for each major category. Thus, the device 1000 may generate the second query information and the noise information through a classification name about an extracted keyword by inputting the first query information into the noise learning model. Because an example of generating the second query information by inputting the first query information into the noise learning model may be the same as that described above with reference to FIGS. 7 and 8, redundant descriptions thereof will be omitted for conciseness.

Moreover, the noise learning model according to some embodiments may generate only the second query information including the noise information when the first query information is input. In this case, the device 1000 may extract noise information based on the difference between the first query information and the second query information and store the noise information in a memory (not illustrated) of the device 1000. Thus, when response information including the noise information is received, the device 1000 may generate a response message by removing the noise information included in the response information by using the stored noise information.

Figure 10:
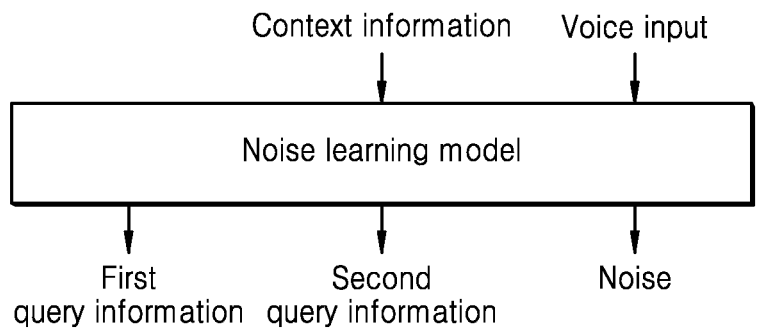

Referring to FIG. 10, a device 1000 according to some embodiments may generate the first query information, the second query information, and the noise information by inputting the context information and the user's voice input into the noise learning model. That is, the device 1000 may generate all of the first query information, the second query information, and the noise information by using only one learning model.

For example, when the context information includes 'User weight 75 kg' and 'Dogok' and 'I can't lose weight well . . . ' is received as the user's voice input, the device 1000 may use the noise learning model to generate '75 kg', 'Dogok', and 'Is there a diet method?' as the first query information. SPACE. Also, in this case, by using the noise learning model, the device 1000 may change the user's weight '75 kg' to '+5 kg' that is the changed numerical data value, and may generate the second query information including 'Yeoksam' and 'Yangjae' within a certain distance from 'Dogok'. Also, the device 1000 may extract 'Yeoksam' and 'Yangjae' as a noise by using the noise learning model.

Figure 11:
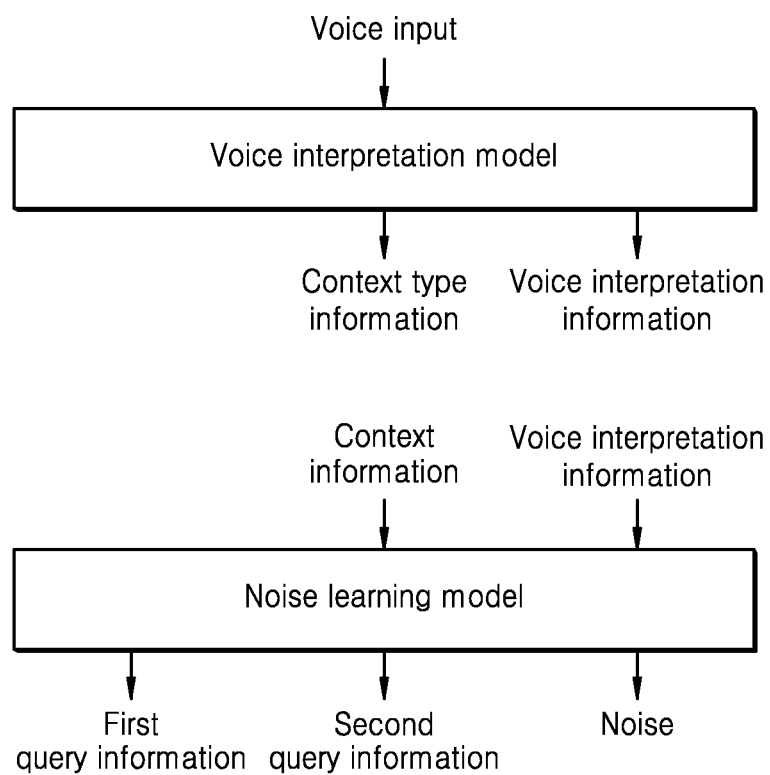

Referring to FIG. 11, a device 1000 according to some embodiments may determine the type of context information required to generate response information with respect to the voice input, by interpreting the user's voice input by using the voice interpretation model. A learning model for interpreting the user's voice input may be a learning model for analyzing the meaning of the user's input voice. For example, by inputting question and answer (QNA) data into the voice interpretation model, the learning model for interpreting the user's voice input may be generated and trained.

The device 1000 according to some embodiments may input, instead of the voice input, voice interpretation information generated by the voice interpretation model into the noise learning model. Thus, the device 1000 may generate the first query information, the second query information, and the noise information by inputting the context information and the voice interpretation information into the noise learning model.

Figure 12:
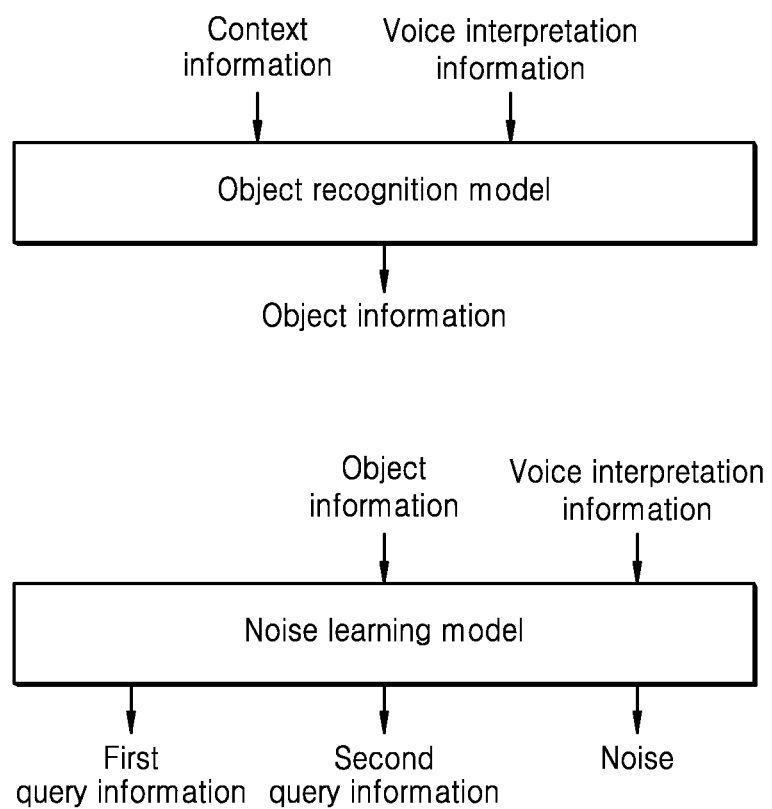

Referring to FIG. 12, when the context information according to some embodiments includes a certain image, a device 1000 may use the object recognition model to obtain object information included in the image. That is, the device 1000 may obtain information about the object included in the image as a text by inputting the image into the object recognition model.

For convenience of description, assume a case where the context information includes an image of the inside of the refrigerator and the voice interpretation information is 'Tell me a good snack recipe'. By using the object recognition model, the device 1000 may obtain an object related to a keyword 'Snack' included in the voice interpretation information from the image of the inside of the refrigerator. The object related to the keyword 'Snack' included in the voice interpretation information may include 'alcohol' or 'food ingredient'. Thus, the device 1000 may recognize objects corresponding to 'alcohol' and 'food ingredient' from the image of the inside of the refrigerator by using the object recognition model. For example, the device 1000 may recognize objects such as 'Soju', 'Beer', and 'Meat' from the image of the inside of the refrigerator by using the object recognition model and the voice interpretation information.

FIGS. 13 to 16 are diagrams illustrating an example in which a device provides a voice assistance service related to user's privacy information, according to various embodiments of the disclosure.

Figure 13:
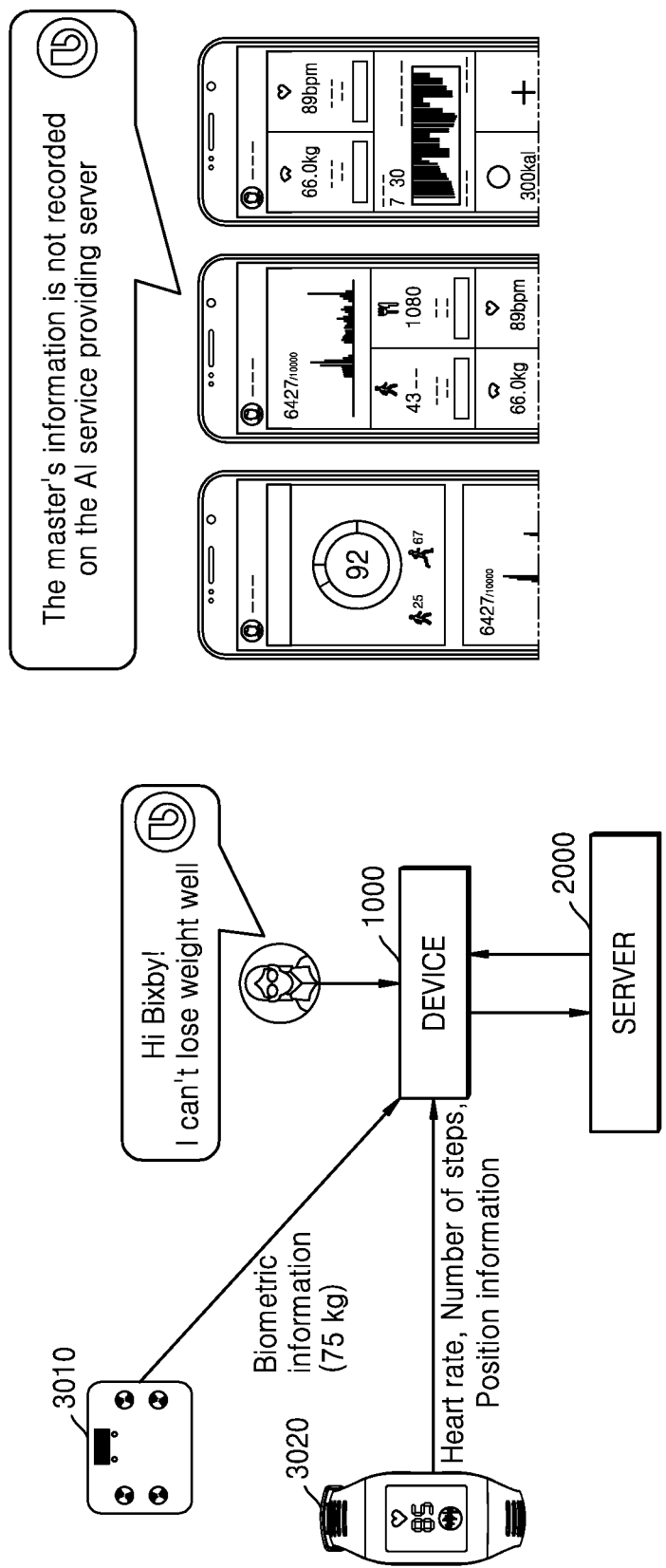
FIGS. 13, 14, 15, and 16 are diagrams illustrating an example in which a device provides a voice assistance service related to user's privacy information, according to various embodiments of the disclosure.

Referring to FIG. 13, a device 1000 according to some embodiments may obtain 'Hi Bixby! I can't lose weight well . . . ' as the user's voice input.SPACE. According to the user's voice input, the device 1000 may determine the type of context information related to the user's weight. For example, the context information related to the user's weight may include sensing data such as the user's weight measurement value, the user's heart rate, the number of steps, and the position information. The device 1000 may request the peripheral device 3000, such as a weight scale or a smart watch, corresponding to the determined type of context information for the context information.

The device 1000 may receive the context information of the determined type from the peripheral device 3000 and may transmit the query information including the noise information to the server based on the received context information. Moreover, because the query information transmitted to the server 2000 includes the noise information, the server 2000 may not identify the user's context information from the received query information. Thus, the user's privacy information may not be recorded in the server 2000.

Figure 14:
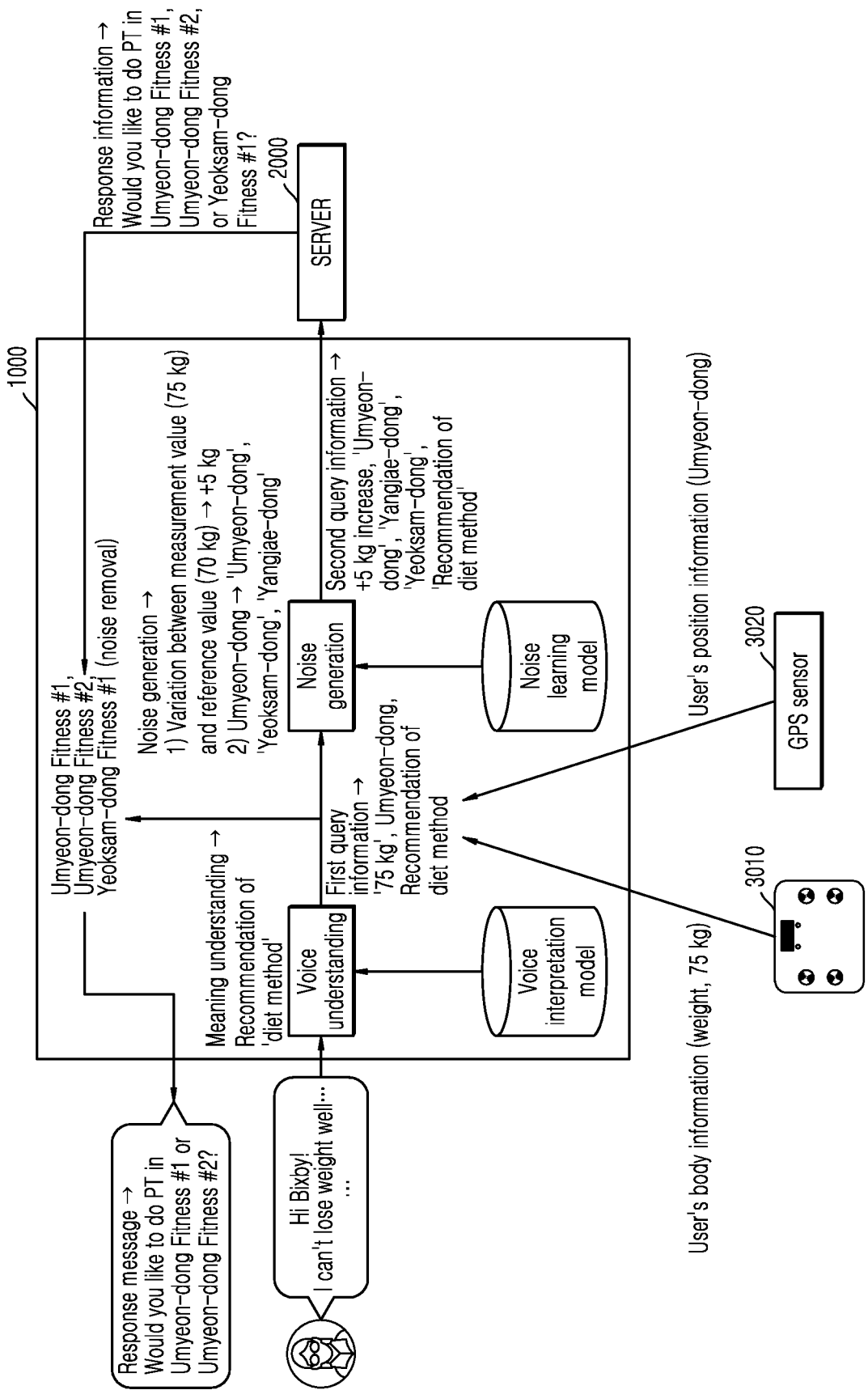

Referring to FIG. 14, a device 1000 according to some embodiments may learn the meaning included in the voice input 'Hi Bixby! I can't lose weight well . . . ' by using the voice interpretation model. SPACE. The device 1000 may learn the meaning of 'recommend a diet method' as a result of learning the voice input 'I can't lose weight well . . . ' by using the voice interpretation model. SPACE. Accordingly, the device 1000 may determine a measurement value and sensing data required to provide a response message to the user, as a type of context information of the user. The device 1000 may obtain, as the context information, the user's body information Weight '75 kg' from the home appliance 3010 (e.g., a weight scale) and the user's position information 'Umyeon-dong' from the sensor 3020 (e.g., a GPS sensor).

Also, the device 1000 may generate '75 kg, Umyeon-dong, Diet method recommendation' as the first query information based on the voice interpretation and the context information. The device 1000 may generate the second query information including the noise information by inputting the first query information into the noise learning model. For example, the numerical data value '75 kg' representing the user's body state may be changed to '+5 kg' corresponding to a variation according to a preset reference value '70 kg'. Also, the device 1000 may generate, as a noise, 'Yeoksam-dong' and 'Yangjae-dong' within a certain distance from the 'Umyeon-dong' by using the noise learning model. Accordingly, the device 1000 may generate '+5 kg, Umyeon-dong, Yangjae-dong, Yeoksam-dong, and Diet method recommendation' as the second query information.

Also, the device 1000 may transmit the generated second query information to the server 2000. Accordingly, the device 1000 may receive 'Would you like to do PT in Umyeon-dong Fitness #1, Umyeon-dong Fitness #2, or Yeoksam-dong Fitness #1?' as response information with respect to the second query information from the server 2000.

Also, based on the first query information or the prestored noise information, by removing the noise information included in the response information, the device 1000 may output a response message 'Would you like to do PT in Umyeon-dong Fitness #1 or Umyeon-dong Fitness #2?'.

That is, referring to FIG. 14, a device 1000 may obtain a response message desired by the user even without transmitting the user's privacy information to the server 2000.

Figure 15:
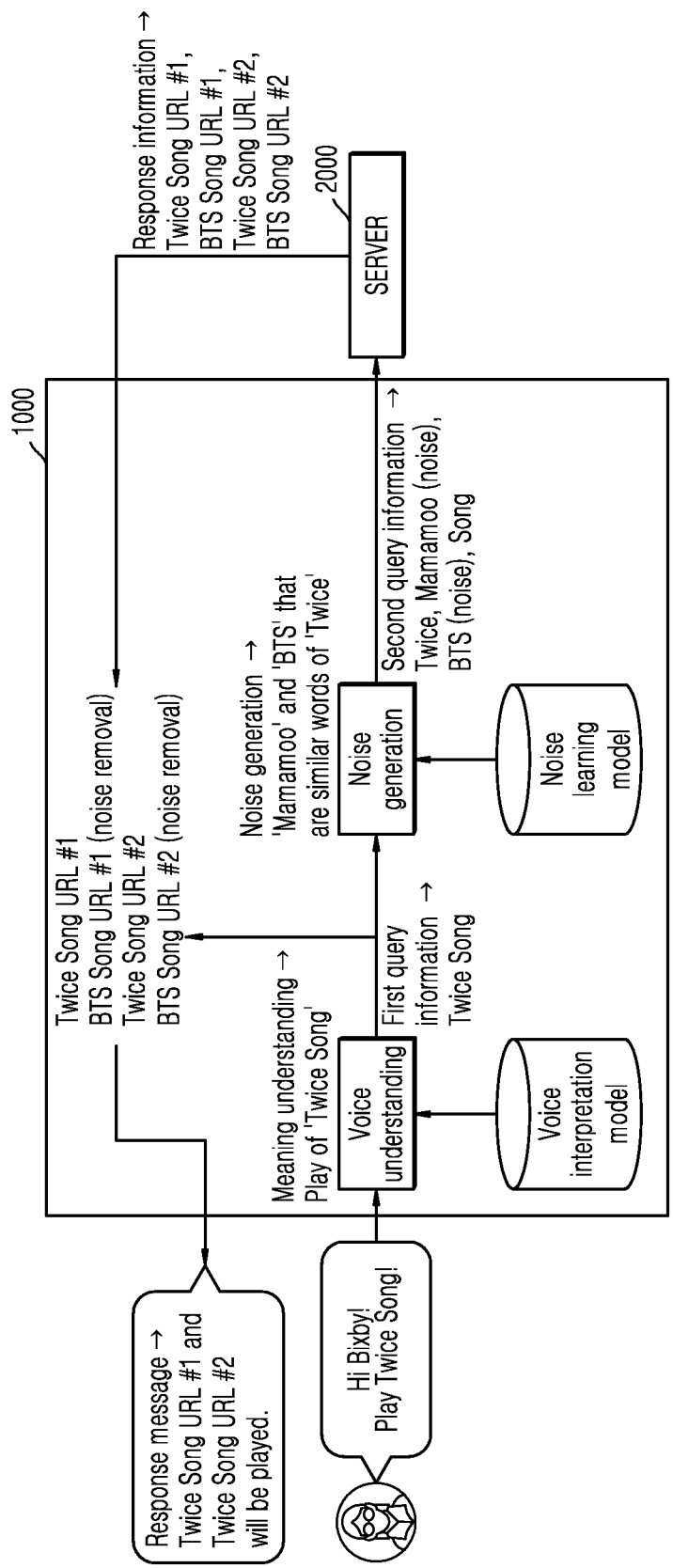

Referring to FIG. 15, a device 1000 according to some embodiments may obtain the user's voice input 'Hi Bixby! Play Twice Song!'. In this case, the user's voice input may be directly obtained by the device 1000, or the voice input obtained by the peripheral device 3000 may be transmitted to the device 1000.

For example, when the device 1000 is an AI speaker, the user's voice input may be directly input into the AI speaker. Also, the AI speaker may receive the user's voice input obtained by a smart phone that is the peripheral device 3000. That is, when the user's voice input 'Hi Bixby! Play Twice Song!' is input into the smart phone, the AI speaker may perform an operation according to the user's voice input.

The device 1000 may learn the meaning included in the user's voice input by using the voice interpretation model. Also, the device 1000 may generate the first query information "Twice, Song" based on the learned voice interpretation "Play Twice Song". Also, by inputting the first query information into the noise learning model, the device 1000 may generate 'Mamamoo' or 'BTS' corresponding to an idol group singer like 'Twice' as a noise and may generate the second query information including the noise information. Accordingly, the second query information may be 'Twice, Mamamoo, BTS Song'. The device 1000 may transmit the second query information to the server 2000 and may obtain "Twice Song URL #1, BTS Song URL #1, Twice Song URL #2, BTS Song URL #2" as response information corresponding to the second query information. Also, by using the first query information or the noise information prestored in the device 1000, the device 1000 may output a response message "Play Twice Song URL #1 and Twice Song URL #2." in which the noise information is removed from the response information.SPACE. Also, the device 1000 may perform an operation corresponding to the response message. That is, the device 1000 may play a Twice song corresponding to the Twice Song URL #1 according to the response message.

Figure 16:
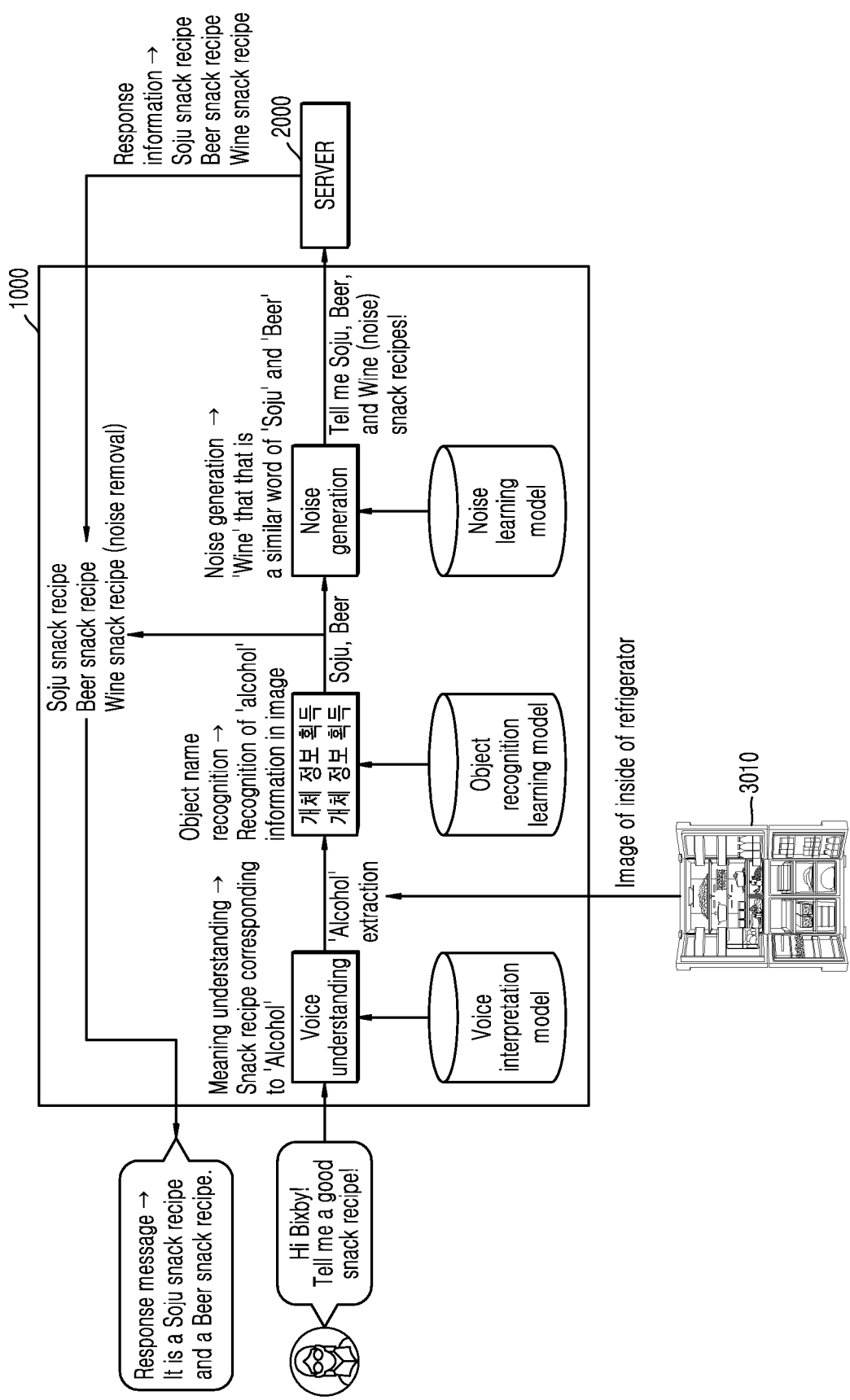

Referring to FIG. 16, a device 1000 according to some embodiments may learn the meaning included in the user's voice input 'Hi Bixby! tell me a good snack recipe!' by using the voice interpretation model. The device 1000 may learn a meaning of 'Recommend a snack recipe corresponding to the alcohol owned the user' as a result of the voice interpretation. Accordingly, the device 1000 may obtain an image of the inside of the refrigerator as required context information in order to obtain alcohol information owned by the user. That is, the device 1000 may obtain an image of the inside of the refrigerator from the home appliance 3010, that is, the refrigerator, in response to the image of the inside of the refrigerator, which is the determined context type.

Also, by using the object recognition model, the device 1000 may obtain the alcohol information from the image of the inside of the refrigerator based on the received context information and the voice interpretation. Accordingly, the device 1000 may obtain 'Soju, Beer' as the first query information and may obtain 'Wine' corresponding to the alcohol as a noise by inputting 'Soju, Beer' into the noise learning model. Also, the device 1000 may generate the second query information 'Tell me Soju, Beer, and Wine snack recipes!' in which the noise information is added to the first query information.

The device 1000 may obtain, from the server 2000, 'Soju snack recipe, Beer snack recipe, Wine snack recipe' as a first response message corresponding to the second query information. Also, based on the first query information or the prestored noise information, the device 1000 may generate a second response message in which information corresponding to the noise is removed from the first response message. In this case, the response message may output the Soju snack recipe or the Beer snack recipe as a sound through the speaker. Also, "Soju snack recipe, Beer snack recipe" corresponding to the response message may be displayed on the screen of the device 1000 in the form of a text or an image.

Figure 17:
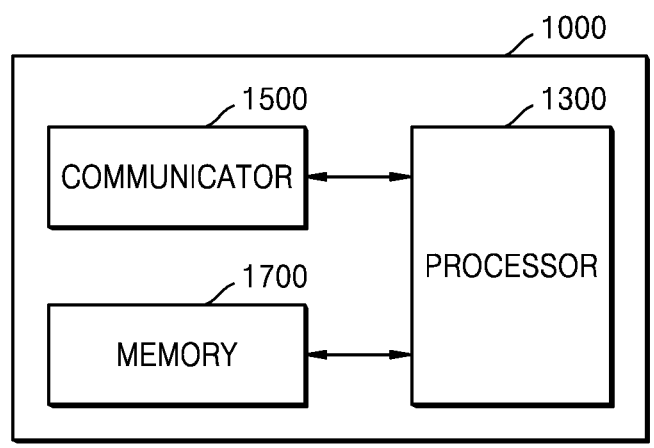
FIGS. 17 and 18 are block diagrams of a device according to various embodiments of the disclosure.
Figure 18:
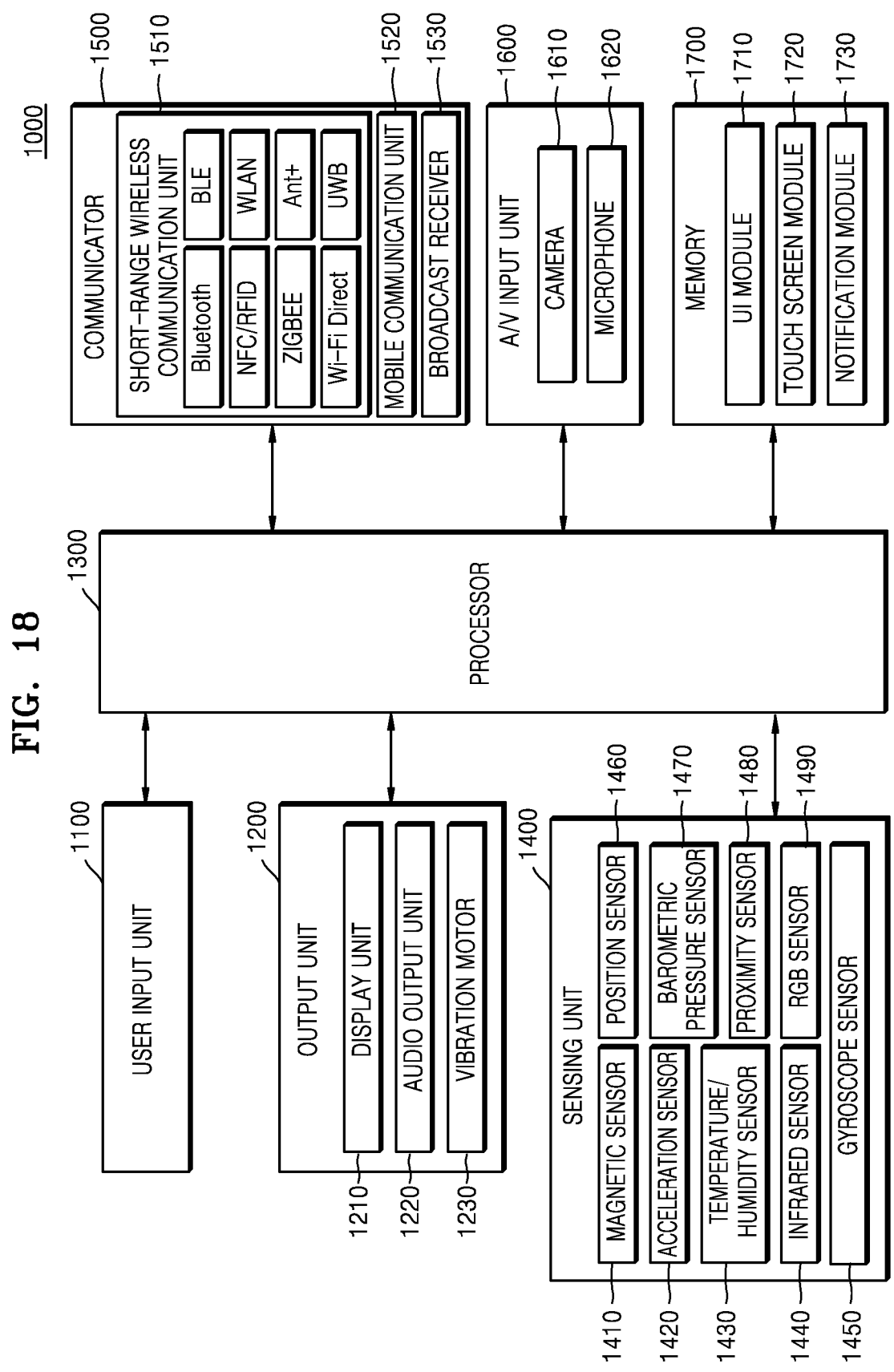

FIGS. 17 and 18 are block diagrams of a device according to various embodiments of the disclosure.

Referring to FIG. 17, a device 1000 according to some embodiments may include a communicator 1500, a memory 1700, and a processor 1300. However, not all of the components illustrated in FIG. 17 are necessary components of the device 1000. The device 1000 may be implemented by more components than the components illustrated in FIG. 17 or may be implemented by less components than the components illustrated in FIG. 17.

For example, referring to FIG. 18, a device 1000 according to some embodiments may further include a user input unit 1100, a sensing unit 1400, and an audio/video (A/V) input unit 1600 in addition to a communicator 1500, an output unit 1200, a memory 1700, and a processor 1300.

The user input unit 1100 may refer to a unit through which the user inputs data for controlling the device 1000. For example, the user input unit 1100 may include, but is not limited to, a key pad, a dome switch, a touch pad (e.g., a capacitive overlay type, a resistive overlay type, an infrared beam type, a surface acoustic wave type, an integral strain gauge type, or a piezoelectric type), a jog wheel, and a jog switch.

The user input unit 1100 may receive a user input for a voice assistance service. The user input unit 1100 may receive a user input for executing a voice assistance service.

The output unit 1200 may output an audio signal, a video signal, or a vibration signal and may include a display unit 1210, an audio output unit 1220, and a vibration motor 1230.

The display unit 1210 may display and output information processed by the device 1000. For example, the display unit 1210 may display a graphical user interface (GUI) for a voice assistance service.

Moreover, when the display unit 1210 and a touch pad are configured as a touch screen by forming a layer structure, the display unit 1210 may be used as an input device in addition to an output device. Depending on the implementation type of the device 1000, the device 1000 may include two or more display units 1210.

The audio output unit 1220 may output audio data received from the communicator 1500 or stored in the memory 1700. Also, the audio output unit 1220 may output an audio signal related to a function (e.g., a call signal reception sound, a message reception sound, or a notification sound) performed by the device 1000. The audio output unit 1220 may include a speaker, a buzzer, and/or the like. The audio output unit 1220 may output a sound of a response message of a voice assistance service.

The vibration motor 1230 may output a vibration signal. For example, the vibration motor 1230 may output a vibration signal corresponding to the output of audio data or video data (e.g., a call signal reception sound or a message reception sound).

The processor 1300 may generally control an overall operation of the device 1000. For example, the processor 1300 may control the overall operations of the user input unit 1100, the output unit 1200, the sensing unit 1400, the communicator 1500, and the A/V input unit 1600 by executing the programs stored in the memory 1700. The processor 1300 may control an operation of the device 1000 in the disclosure by executing the programs stored in the memory 1700.

Particularly, the processor 1300 may receive context information from the peripheral device 3000 through the communicator 1500. The processor 1300 may periodically receive context information from the peripheral device 3000 or may receive context information according to a request transmitted from the processor 1300.

The processor 1300 may obtain a user's voice input in order to provide a voice assistance service. The processor 1300 may directly obtain a user's voice input and may also obtain, through the communicator 1500, a user's voice input received in the peripheral device 3000.

The processor 1300 may receive certain context information from at least one peripheral device 3000 based on the user's voice input. The processor 1300 may interpret the user's voice input by using a voice interpretation model, determine the type of context information required to generate response information with respect to the voice input, and receive context information of the determined type from the peripheral device 3000.

The processor 1300 may generate first query information from the received context information and the voice input. Also, the processor 1300 may generate second query information including noise information by inputting the first query information into a noise learning model. Particularly, the processor 1300 may generate second query information including similar word information corresponding to a keyword included in the first query information, by inputting the first query information into a noise learning model using at least one of a knowledge base, an open source, or a list of similar words. Moreover, when the received context information includes numerical data representing the user's body state, the processor 1300 may generate second query information by changing a value of the numerical data representing the user's body state according to a preset reference.

The processor 1300 may transmit the generated second query information to the server 2000 through the communicator 1500. Also, the processor 1300 may receive response information generated based on the transmitted second query information, from the server 2000 through the communicator 1500.

Also, the processor 1300 may generate a response message by removing information corresponding to noise information from the received response information. According to some embodiments, the processor 1300 may generate a response message in which information corresponding to the noise is removed from the response information, by inputting the noise information or the first query information prestored in the memory 1700 into a second learning model.

The processor 1300 may output the generated response message. The processor 1300 may display the text of the response message on the screen of the device 1000. The device 1000 may output the sound of the response message through the speaker of the device 1000.

The sensing unit 1400 may sense a state of the device 1000 or a state around the device 1000 and transmit the sensed information to the processor 1300.

The sensing unit 1400 may include at least one of a magnetic sensor 1410, an acceleration sensor 1420, a temperature/humidity sensor 1430, an infrared sensor 1440, a gyroscope sensor 1450, and a position sensor (e.g., GPS) 1460, a barometric pressure sensor 1470, a proximity sensor 1480, and a red green blue (RGB) sensor (illuminance sensor) 1490 but is not limited thereto. Because the function of each sensor may be intuitively inferred from its name by those of ordinary skill in the art, redundant descriptions thereof will be omitted for conciseness.

The communicator 1500 may include one or more components for communication with the server 2000 and the peripheral device 3000. For example, the communicator 1500 may include a short-range wireless communication unit 1510, a mobile communication unit 1520, and a broadcast receiver 1530.

The short-range wireless communication unit 1510 may include, but is not limited to, a Bluetooth communication unit, a Bluetooth low energy (BLE) communication unit, a near field communication unit, a WLAN (Wi-Fi) communication unit, a ZigBee communication unit, an infrared data association (IrDA) communication unit, a Wi-Fi direct (WFD) communication unit, an ultra wideband (UWB) communication unit, and/or an Ant+ communication unit.

The mobile communication unit 1520 may transmit/receive wireless signals to/from at least one of a base station, an external terminal, or a server on a mobile communication network. Here, the wireless signals may include voice call signals, video call signals, or various types of data according to transmission/reception of text/multimedia messages.

The broadcast receiver 1530 may receive broadcast signals and/or broadcast-related information from the outside through broadcast channels. The broadcast channels may include satellite channels and terrestrial channels. In some embodiments, the device 1000 may not include the broadcast receiver 1530.

Also, the communicator 1500 may transmit/receive information required to provide a voice assistance service, to/from the server 2000 and the peripheral device 3000.

The A/V input unit 1600 may be for inputting an audio signal or a video signal and may include a camera 1610 and a microphone 1620. The camera 1610 may obtain an image frame such as a still image or a moving image through an image sensor in a video call mode or a photographing mode. The image obtained through the image sensor may be processed through the processor 1300 or a separate image processor (not illustrated).

The microphone 1620 may receive an external audio signal and process the same into electrical voice data. For example, the microphone 1620 may receive an audio signal from an external device or a speaker. The microphone 1620 may use various noise removal algorithms for removing the noise generated in the process of receiving the external audio signal.

The memory 1700 may store one or more programs for processing and controlling the operations of the processor 1300 and may store data that is input to the device 1000 or output from the device 1000.

The memory 1700 may include at least one type of storage medium from among flash memory type, hard disk type, multimedia card micro type, card type memory (e.g., secure digital (SD) and extreme digital (XD) memories), random-access memory (RAM), static random-access memory (SRAM), read-only memory (ROM), electronically erasable programmable read-only memory (EEPROM), programmable read-only memory (PROM), magnetic memory, magnetic disk, and optical disk.

The programs stored in the memory 1700 may be classified into a plurality of modules according to their functions and may be classified into, for example, a user interface (UI) module 1710, a touch screen module 1720, and a notification module 1730.

The UI module 1710 may provide a specialized UI, a graphical user interface (GUI), or the like that interoperates with the device 1000 for each application. The touch screen module 1720 may sense a user's touch gesture on a touch screen and transmit information about the touch gesture to the processor 1300. The touch screen module 1720 according to some embodiments may recognize and analyze a touch code. The touch screen module 1720 may include separate hardware including a controller.

Various sensors may be provided inside or near the touch screen to sense a proximity touch or a touch of the touch screen. Also, a proximity sensor may be an example of a sensor for sensing the touch of a touch screen. The user's touch gesture may include tap, touch & hold, double tap, drag, pan, flick, drag and drop, swipe, and the like.

The notification module 1730 may generate a signal for notifying the occurrence of an event in the device 1000.

Figure 19:
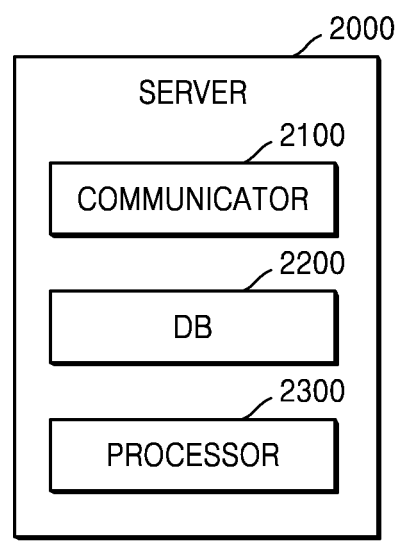
FIG. 19 is a block diagram of an AI service providing server according to an embodiment of the disclosure.

FIG. 19 is a block diagram of a server according to an embodiment of the disclosure.

Referring to FIG. 19, a server 2000 according to some embodiments may include a communicator 2100, a database (DB) 2200, and a processor 2300.

The communicator 2100 may include one or more components for communication with the device 1000.

The DB 2200 may store one or more programs for processing and controlling the operations of the processor 2300 and may store data that is input to the server 2000 or output from the server 2000. In this case, even when the DB 2200 stores data input to the server 2000, because the second query information that is the input data may include noise information, the user's privacy information may not be identified and thus may be protected.

The DB 2200 may include, but is not limited to, at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk.

The programs stored in the DB 2200 may be classified into a plurality of modules according to the functions thereof.

The processor 2300 may generally control an overall operation of the server 2000. For example, the processor 2300 may control the overall operations of the communicator 2100, the DB 2200, and the like by executing the programs stored in the DB 2200. The processor 2300 may control an operation of the server 2000 of the disclosure by executing the programs stored in the DB 2200. The processor 2300 may generate response information based on the second query information received from the device 1000.

Particularly, the processor 2300 may include a function of generating a learning model for generating a response message with respect to a user's voice input but is not limited thereto.

Also, the processor 2300 may provide the generated response message to the device 1000 through the communicator 2100.

Moreover, the peripheral device 3000 may be implemented as a component of the device 1000 or a component of the server 2000, and a processor (not illustrated) in the peripheral device 3000 may control an operation of the peripheral device 3000 in the disclosure.

Figure 20:
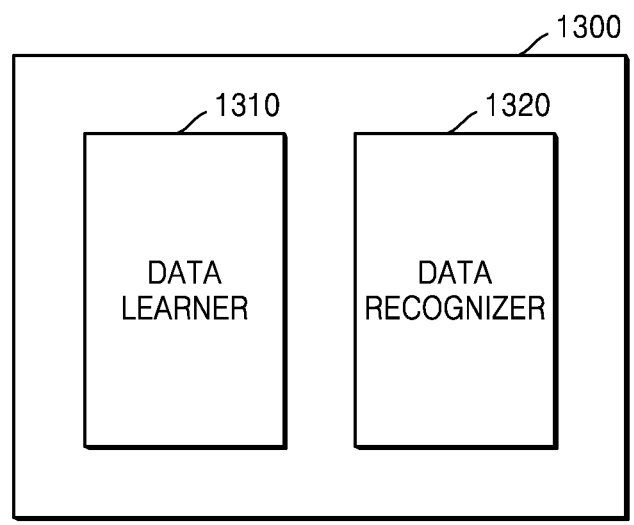
FIG. 20 is a block diagram of a processor according to an embodiment of the disclosure.

FIG. 20 is a block diagram of a processor according to an embodiment of the disclosure.

Referring to FIG. 20, a processor 1300 according to some embodiments may include a data learner 1310 and a data recognizer 1320.

The data learner 1310 may learn a reference for including noise information in query information. The data learner 1310 may learn a reference about which data is to be used to include the noise information in the query information and how to include the noise information in the query information by using the data. The data learner 1310 may learn a reference about how to interpret the user's voice input and how to generate the noise information based on the voice interpretation and the context information. The data learner 1310 may learn a reference for including the noise information in the query information by obtaining data to be used for training and applying the obtained data to a noise learning model described below.

The data recognizer 1320 may provide output data for including the noise information in the query information, based on input data. The data recognizer 1320 may interpret the user's voice input from certain data by using a trained noise learning model and may determine the noise information to be included in the query information based on the voice interpretation and the context information. The data recognizer 1320 may provide query information including the noise and the noise information based on certain data as output data by obtaining certain data according to a preset reference by learning and then using a noise learning model by using the obtained data as an input value. Also, a result value output by the noise learning model by using the obtained data as an input value may be used to update the noise learning model.

At least one of the data learner 1310 and the data recognizer 1320 may be manufactured in the form of at least one hardware chip and mounted on an electronic device. For example, at least one of the data learner 1310 and the data recognizer 1320 may be manufactured in the form of a dedicated hardware chip for artificial intelligence (AI) or may be manufactured as a portion of a general-purpose processor (e.g., a central processing unit (CPU) or an application processor) or a graphic processor (e.g., a graphics processing unit (GPU)) and mounted on various electronic devices described above.

In this case, the data learner 1310 and the data recognizer 1320 may be mounted on one electronic device or may be respectively mounted on separate electronic devices. For example, one of the data learner 1310 and the data recognizer 1320 may be included in the electronic device, and the other may be included in the server. Also, the data learner 1310 and the data recognizer 1320 may provide model information constructed by the data learner 1310 to the data recognizer 1320 through wired or wireless communication, or data input into the data recognizer 1320 may be provided as additional training data to the data learner 1310.

Moreover, at least one of the data learner 1310 and the data recognizer 1320 may be implemented as a software module. When at least one of the data learner 1310 and the data recognizer 1320 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Figure 21:
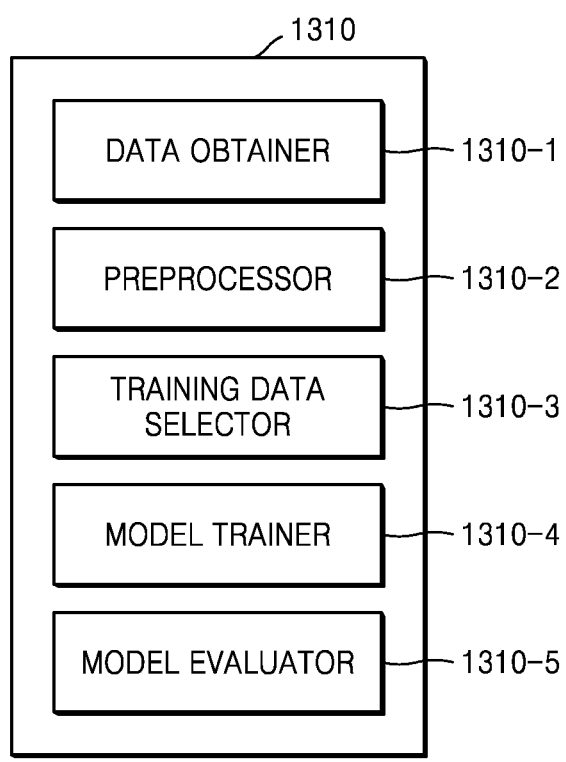
FIG. 21 is a block diagram of a data learner according to an embodiment of the disclosure.

FIG. 21 is a block diagram of a data learner according to an embodiment of the disclosure.

Referring to FIG. 21, a data learner 1310 according to some embodiments may include a data obtainer 1310-1, a preprocessor 1310-2, a training data selector 1310-3, a model trainer 1310-4, and a model evaluator 1310-5.

The data obtainer 1310-1 may obtain data required to include the noise information in the query information. The data obtainer 1310-1 may obtain data necessary for training for including the noise information in the query information. For example, the data obtainer 1310-1 may obtain the data of FIGS. 9 to 12 but is not limited thereto.

The preprocessor 1310-2 may preprocess the obtained data such that the obtained data may be used for training for including the noise information in the query information. The preprocessor 1310-2 may process the obtained data in a preset format such that the model trainer 1310-4 described below may use the obtained data for training for including the noise information in the query information.

The training data selector 1310-3 may select data necessary for training among the preprocessed data. The selected data may be provided to the model trainer 1310-4. The training data selector 1310-3 may select data necessary for training among the preprocessed data according to a preset reference. Also, the training data selector 1310-3 may select data according to a preset reference by training by the model trainer 1310-4 described below.

The model trainer 1310-4 may learn a reference for including the noise information in the query information, based on training data. Also, the model trainer 1310-4 may learn a reference about which training data is to be used.

Also, the model trainer 1310-4 may train a noise learning model used to include the noise information in the query information in a character. In this case, the noise learning model may be a pre-constructed model. For example, the noise learning model may be a model pre-constructed by receiving basic training data.

Alternatively, the model trainer 1310-4 may generate a noise learning model and train the generated noise learning model. Also, the noise learning model may include a plurality of learning models. For example, the noise learning model may include a learning model for interpreting the user's input voice and/or a learning model for determining the characteristics of the noise based on the voice interpretation and the context information but is not limited thereto.

The noise learning model may be constructed by considering the application field of the recognition model, the purpose of learning, or the computer performance of the device. The noise learning model may be, for example, a model based on a neural network. For example, a model such as a deep neural network (DNN), a recurrent neural network (RNN), or a bidirectional recurrent deep neural network (BRDNN) may be used as the noise learning model; however, the disclosure is not limited thereto.

According to various embodiments, when there are a plurality of pre-constructed noise learning models, the model trainer 1310-4 may determine a noise learning model having a high relationship between input training data and basic training data as a noise learning model to be trained. In this case, the basic training data may be pre-classified for each type of data, and the noise learning model may be pre-constructed for each type of data. For example, the basic training data may be pre-classified by various references such as the region where the training data is generated, the time when the training data is generated, the size of the training data, the genre of the training data, the generator of the training data, and the type of an object in the training data.

Also, the model trainer 1310-4 may train a character learning model by using, for example, a training algorithm including error back-propagation or gradient descent.

Also, the model trainer 1310-4 may train the noise learning model, for example, through supervised learning using training data as an input value. Also, the model trainer 1310-4 may train the noise learning model, for example, unsupervised learning for finding a reference for situation determination by learning the type of data necessary for situation determination without particular supervision by itself. Also, the model trainer 1310-4 may train the noise learning model, for example, through reinforcement learning using feedback about whether the result of situation determination according to learning is correct.

Also, when the noise learning model is trained, the model trainer 1310-4 may store the trained noise learning model. In this case, the model trainer 1310-4 may store the trained noise learning model in the memory of an electronic device including the data recognizer 1320. Alternatively, the model trainer 1310-4 may store the trained noise learning model in the memory of an electronic device including the data recognizer 1320 described below. Alternatively, the model trainer 1310-4 may store the trained noise learning model in the memory of the server connected to the electronic device through a wired or wireless network.

In this case, the memory in which the trained noise learning model is stored may also store, for example, commands or data related to at least one other component of the electronic device. Also, the memory may store software and/or programs. The program may include, for example, a kernel, middleware, an application programming interface (API), and/or an application program (or "application").

The model evaluator 1310-5 may input evaluation data into the noise learning model and may cause the model trainer 1310-4 to learn when the recognition result output from the evaluation data does not satisfy a certain reference. In this case, the evaluation data may be preset data for evaluating the noise learning model.

For example, the model evaluator 1310-5 may evaluate that the certain reference is not satisfied, when the number or ratio of evaluation data with inaccurate recognition results among the recognition results of the trained character learning model about the evaluation data exceeds a preset threshold value. For example, when the certain reference is defined as a ratio of 2%, the model evaluator 1310-5 may evaluate that the trained noise learning model is not suitable, when the trained noise learning model outputs incorrect recognition results with respect to more than 20 pieces of evaluation data among a total of 1,000 pieces of evaluation data.

Meanwhile, when there are a plurality of trained noise learning models, the model evaluator 1310-5 may evaluate whether each of the trained noise learning models satisfies a certain reference and determine the model satisfying the certain reference as a final noise learning model. In this case, when there are a plurality of models satisfying the certain reference, the model evaluator 1310-5 may determine, as a final noise learning model, any one model or a certain number of models preset in descending order of evaluation scores.

Meanwhile, at least one of the data obtainer 1310-1, the preprocessor 1310-2, the training data selector 1310-3, the model trainer 1310-4, and the model evaluator 1310-5 in the data learner 1310 may be manufactured in the form of at least one hardware chip and mounted on the electronic device. For example, at least one of the data obtainer 1310-1, the preprocessor 1310-2, the training data selector 1310-3, the model trainer 1310-4, and the model evaluator 1310-5 may be manufactured in the form of a dedicated hardware chip for artificial intelligence (AI) or may be manufactured as a portion of a general-purpose processor (e.g., a CPU or an application processor) or a graphic processor (e.g., a GPU) and mounted on various electronic devices described above.

Also, the data obtainer 1310-1, the preprocessor 1310-2, the training data selector 1310-3, the model trainer 1310-4, and the model evaluator 1310-5 may be mounted on one electronic device or may be respectively mounted on separate electronic devices. For example, some of the data obtainer 1310-1, the preprocessor 1310-2, the training data selector 1310-3, the model trainer 1310-4, and the model evaluator 1310-5 may be included in the electronic device, and the others may be included in the server.

Also, at least one of the data obtainer 1310-1, the preprocessor 1310-2, the training data selector 1310-3 the model trainer 1310-4, and the model evaluator 1310-5 may be implemented as a software module. When at least one of the data obtainer 1310-1, the preprocessor 1310-2, the training data selector 1310-3, the model trainer 1310-4, and the model evaluator 1310-5 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Figure 22:
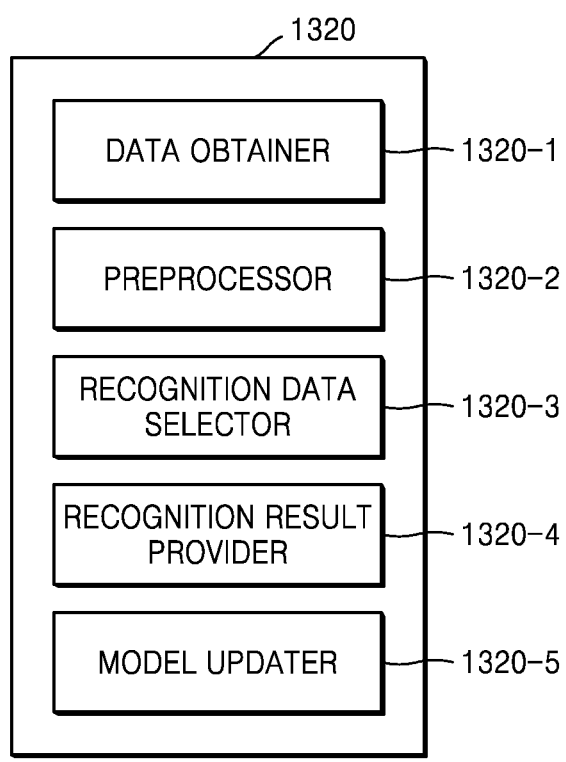
FIG. 22 is a block diagram of a data recognizer according to an embodiment of the disclosure.

FIG. 22 is a block diagram of a data recognizer according to an embodiment of the disclosure.

Referring to FIG. 22, the data recognizer 1320 according to some embodiments may include a data obtainer 1320-1, a preprocessor 1320-2, a recognition data selector 1320-3, a recognition result provider 1320-4, and a model updater 1320-5

The data obtainer 1320-1 may obtain data required to include the noise information in the query information, and the preprocessor 1320-2 may preprocess the obtained data. The preprocessor 1320-2 may process the obtained data in a preset format such that the recognition result provider 1320-4 described below may use the obtained data to include the noise information in the query information. The data obtainer 1320-1 may obtain, for example, the data in FIGS. 9 to 12 but is not limited thereto.

The recognition data selector 1320-3 may select necessary data among the preprocessed data. The selected data may be provided to the recognition result provider 1320-4. The recognition data selector 1320-3 may select necessary data among the preprocessed data according to a preset reference. Also, the recognition data selector 1320-3 may select data according to a preset reference by training by the model trainer 1310-4 described below.

The recognition result provider 1320-4 may apply the selected data to a noise learning model to output data for providing a voice assistance service including the noise information in the query information. The recognition result provider 1320-4 may provide output data according to the purpose of recognizing data. The recognition result provider 1320-4 may apply the selected data to the noise learning model by using the data selected by the recognition data selector 1320-3 as an input value. Also, the recognition result may be determined by the noise learning model.

For example, the noise learning model may include a learning model for interpreting the user's input voice and a learning model for generating the noise information related to the voice interpretation and the context information. Also, for example, the noise learning model may output the interpretation result of the user's voice input and the noise information related to the context information.

The model updater 1320-5 may allow the noise learning model to be updated based on the evaluation of the recognition result provided by the recognition result provider 1320-4. For example, the model updater 1320-5 may allow the model trainer 1310-4 to update the noise learning model, by providing the model trainer 1310-4 with the recognition result provided by the recognition result provider 1320-4.

Meanwhile, at least one of the data obtainer 1320-1, the preprocessor 1320-2, the recognition data selector 1320-3, the recognition result provider 1320-4, and the model updater 1320-5 in the data recognizer 1320 may be manufactured in the form of at least one hardware chip and mounted on the electronic device. For example, at least one of the data obtainer 1320-1, the preprocessor 1320-2, the recognition data selector 1320-3, the recognition result provider 1320-4, and the model updater 1320-5 may be manufactured in the form of a dedicated hardware chip for artificial intelligence (AI) or may be manufactured as a portion of a general-purpose processor (e.g., a CPU or an application processor) or a graphic processor (e.g., a GPU) and mounted on various electronic devices described above.

Also, the data obtainer 1320-1, the preprocessor 1320-2, the recognition data selector 1320-3, the recognition result provider 1320-4, and the model updater 1320-5 may be mounted on one electronic device or may be respectively mounted on separate electronic devices. For example, some of the data obtainer 1320-1, the preprocessor 1320-2, the recognition data selector 1320-3, the recognition result provider 1320-4, and the model updater 1320-5 may be included in the electronic device, and the others may be included in the server.

Also, at least one of the data obtainer 1320-1, the preprocessor 1320-2, the recognition data selector 1320-3 the recognition result provider 1320-4, and the model updater 1320-5 may be implemented as a software module. When at least one of the data obtainer 1320-1, the preprocessor 1320-2, the recognition data selector 1320-3, the recognition result provider 1320-4, and the model updater 1320-5 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Figure 23:
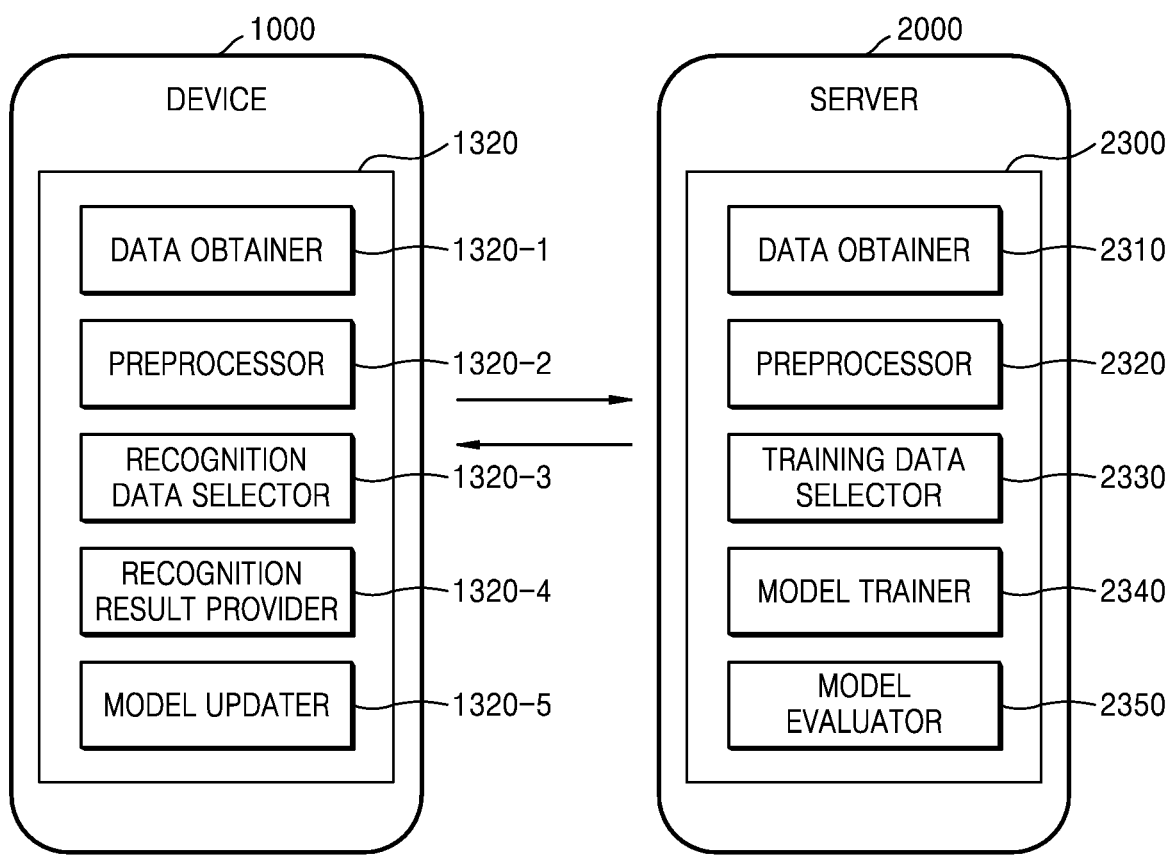
FIG. 23 is a diagram illustrating an example in which a device and a server learn and recognize data by interoperating with each other, according to an embodiment of the disclosure.

FIG. 23 is a diagram illustrating an example in which a device and a server learn and recognize data by interoperating with each other, according to an embodiment of the disclosure.

Referring to FIG. 23, a server 2000 may include a data obtainer 2310, a preprocessor 2320, a training data selector 2330, a model trainer 2340, and a model evaluator 2350. The server 2000 may learn a reference for generating response information based on the query information including the noise information, and a device 1000 may provide a voice assistance service based on the learning result.

In this case, the model trainer 2340 of the server 2000 may learn a reference for generating a response message based on the query information including the noise information. The model trainer 2340 may provide a voice assistance service by obtaining data to be used for training and applying the obtained data to a QNA training model described below.

Also, the recognition result provider 1320-4 of the device 1000 may determine a situation by applying the data selected by the recognition data selector 1320-3 to the QNA training model generated by the server 2000. For example, the recognition result provider 1320-4 may transmit the data selected by the recognition data selector 1320-3 to the server 2000, and the server 2000 may apply the data selected by the recognition data selector 1320-3 to a recognition model to request to generate response information based on the query information including the noise information. Also, the recognition result provider 1320-4 may receive the generated response information from the server 2000.

Alternatively, the recognition result provider 1320-4 of the device 1000 may receive, from the server 2000, the recognition model generated by the server 2000 and may provide a voice assistance service based on the query information including the noise information by using the received recognition model.

Moreover, although FIG. 23 illustrates that the device 1000 and the server 2000 interoperate with each other to provide a voice assistance service based on the query information including the noise information, the disclosure is not limited thereto. The device 1000, the server 2000, and the peripheral device 3000 may interoperate with each other to provide a voice assistance service based on the query information including the noise information.

Some embodiments may also be implemented in the form of computer-readable recording mediums including instructions executable by computers, such as program modules executed by computers. The computer-readable recording mediums may be any available mediums accessible by computers and may include volatile or non-volatile mediums and removable or non-removable mediums. Also, the computer-readable recording mediums may include computer-readable storage mediums. The computer-readable storage mediums may include both volatile or non-volatile and detachable and non-detachable mediums implemented by any method or technology for storage of information such as computer-readable instructions, data structures, program modules, or other data.

Also, herein, the "unit" may include a hardware component such as a processor or a circuit and/or a software component executed by a hardware component such as a processor.

The foregoing is illustrative of embodiments of the disclosure, and those of ordinary skill in the art will readily understand that various modifications may be made therein without materially departing from the spirit or features of the disclosure. Therefore, it is to be understood that the embodiments of the disclosure described above should be considered in a descriptive sense only and not for purposes of limitation. For example, each component described as a single type may also be implemented in a distributed manner, and likewise, components described as being distributed may also be implemented in a combined form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a device providing a voice assistance service, the method comprising:
   obtaining a voice input of a user;
   in response to obtaining the voice input, receiving context information from at least one peripheral device;
   generating first query information from the context information and the voice input;
   generating second query information including noise information by inputting the first query information into a noise learning model;
   transmitting the second query information to a server;
   receiving, from the server, response information obtained based on the second query information;
   generating a response message by removing a portion of the response information corresponding to the noise information from the response information; and
   outputting the response message,
   wherein the context information comprises at least one of an image, a measurement value, or sensing data that are obtained from the at least one peripheral device, and
   wherein the portion of the response information corresponding to the noise information is identified based on the first query information.

2. The method of claim 1, wherein the noise learning model comprises an artificial intelligence algorithm that is a learning model having been trained by using at least one of machine learning, a neural network, a genetic algorithm, deep learning, or a classification algorithm.

3. The method of claim 1, wherein the receiving of the context information comprises:
   based on the voice input, determining a type of context information to be received; and
   requesting a peripheral device corresponding to the determined type for the context information of the determined type.

4. The method of claim 3, wherein the determining of the type of the context information to be received comprises determining a type of context information required to generate response information with respect to the voice input, by interpreting the voice input by using a voice interpretation model.

5. The method of claim 1,
   wherein the context information comprises an image obtained by the at least one peripheral device, and
   wherein the method further comprises recognizing an object related to the voice input among objects in the image by using an object recognition model.

6. The method of claim 1,
   wherein the context information comprises numerical data representing a body state of the user, and
   wherein the generating of the second query information including the noise information comprises changing a value of the numerical data representing the body state of the user according to a preset reference.

7. The method of claim 1, wherein the response message is obtained by removing the portion of the response information corresponding to the noise information by inputting the first query information into a response learning model.

8. A computer program product comprising a non-transitory computer-readable recording medium having recorded thereon a program for executing the method of claim 1.

9. A device for providing a voice assistance service, the device comprising:
   a communication interface;
   a processor; and
   a memory storing one or more instructions which, when executed by the processor, cause the processor to:
   obtain a voice input of a user,
   in response to obtaining the voice input, receive context information from at least one peripheral device, generate first query information from the context information and the voice input, generate second query information including noise information by inputting the first query information into a noise learning model, transmit the second query information to a server, receive, from the server, response information obtained based on the second query information, generate a response message by removing a portion of the response information corresponding to the noise information from the response information, and output the response message, wherein the context information comprises at least one of an image, a measurement value, or sensing data that are obtained from the at least one peripheral device, and wherein the portion of the response information corresponding to the noise information is identified based on the first query information.

10. The device of claim 9, wherein the noise learning model comprises an artificial intelligence algorithm that is a learning model having been trained by using at least one of machine learning, an artificial neural network, a genetic algorithm, deep learning, or a classification algorithm.

11. The device of claim 9, wherein the processor is further configured to:

determine a type of context information to be received, based on the voice input, and request a peripheral device corresponding to the determined type for the context information of the determined type.

12. The device of claim 11, wherein the processor is further configured to determine a type of context information required to generate response information with respect to the voice input, by interpreting the voice input by using a voice interpretation model.

13. The device of claim 10, wherein the response message is obtained by removing the portion of the response information corresponding to the noise information by inputting the first query information into a response learning model.

* * * * *